US010400105B2

(12) United States Patent
Stevens

(10) Patent No.: US 10,400,105 B2
(45) Date of Patent: Sep. 3, 2019

(54) EXTRUDED STARCH-LIGNIN FOAMS

(71) Applicant: The Research Foundation for The State University of New York, Binghamton, NY (US)

(72) Inventor: Eugene S. Stevens, Binghamton, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 195 days.

(21) Appl. No.: 15/179,630

(22) Filed: Jun. 10, 2016

(65) Prior Publication Data

US 2016/0368186 A1 Dec. 22, 2016

Related U.S. Application Data

(60) Provisional application No. 62/182,237, filed on Jun. 19, 2015.

(51) Int. Cl.
| B29K 1/00 | (2006.01) |
| C08J 9/00 | (2006.01) |
| B29C 44/50 | (2006.01) |
| B29L 31/00 | (2006.01) |
| C08L 97/00 | (2006.01) |

(52) U.S. Cl.
CPC ............ *C08L 97/005* (2013.01); *B29C 44/50* (2013.01); *C08J 9/0061* (2013.01); *B29K 2001/00* (2013.01); *B29K 2003/00* (2013.01); *B29K 2995/006* (2013.01); *B29K 2995/0093* (2013.01); *B29L 2031/712* (2013.01); *C08J 2397/00* (2013.01); *C08J 2403/02* (2013.01)

(58) Field of Classification Search
CPC .. C08J 9/0061; C08J 2403/02; C08J 2397/00; B29K 2001/00; B29K 2003/00; C08L 97/005; B29L 2031/712
See application file for complete search history.

(56) References Cited

U.S. PATENT DOCUMENTS

| 3,954,643 A | 5/1976 | Krings et al. |
| 3,978,264 A | 8/1976 | Tarbell et al. |
| 4,025,657 A | 5/1977 | Cheng et al. |
| 4,072,535 A | 2/1978 | Short et al. |
| 4,119,757 A | 10/1978 | Hobson et al. |
| 4,145,487 A | 3/1979 | Behme et al. |
| 4,185,147 A | 1/1980 | Blount |
| 4,192,900 A | 3/1980 | Cheng |
| 4,237,182 A | 12/1980 | Fulmer et al. |
| 4,242,497 A | 12/1980 | Blount |
| 4,281,110 A | 7/1981 | Blount |
| 4,282,236 A | 8/1981 | Broom |
| 4,283,311 A | 8/1981 | Blount |
| 4,314,916 A | 2/1982 | Blount |
| 4,316,745 A | 2/1982 | Blount |
| 4,323,494 A | 4/1982 | Blount |
| 4,324,835 A | 4/1982 | Keen |
| 4,324,864 A | 4/1982 | Blount |
| 4,328,136 A | 5/1982 | Blount |
| 4,329,437 A | 5/1982 | Blount |
| 4,374,208 A | 2/1983 | Fallows et al. |
| 4,401,772 A | 8/1983 | Fuzesi et al. |
| 4,504,516 A | 3/1985 | Schanze |
| 4,540,594 A | 9/1985 | Schanze |
| 4,655,950 A | 4/1987 | Michalek |
| 4,698,232 A | 10/1987 | Sheu et al. |
| 4,743,624 A | 5/1988 | Blount |
| 4,778,844 A | 10/1988 | Blount |
| 4,834,996 A | 5/1989 | Fazzolare et al. |
| 4,842,763 A | 6/1989 | Troger et al. |
| 4,859,713 A | 8/1989 | Blount |
| 4,863,655 A | 9/1989 | Lacourse et al. |
| 4,983,651 A | 1/1991 | Griffin |
| 5,035,930 A | 7/1991 | Lacourse et al. |
| 5,043,196 A | 8/1991 | Lacourse et al. |
| 5,093,416 A | 3/1992 | Blount |
| 5,104,673 A | 4/1992 | Fazzolare et al. |
| 5,106,880 A | 4/1992 | Miller et al. |
| 5,116,550 A | 5/1992 | Perkins |
| 5,118,515 A | 6/1992 | Montemayor et al. |
| 5,139,801 A | 8/1992 | deJesus Montemayor et al. |
| 5,153,037 A | 10/1992 | Altieri |
| 5,160,377 A | 11/1992 | Montemayor et al. |
| 5,185,382 A | 2/1993 | Neumann et al. |
| 5,208,267 A | 5/1993 | Neumann et al. |
| 5,238,596 A | 8/1993 | Smith |

(Continued)

OTHER PUBLICATIONS

Stevens et al., "Starch-Lignin Foams", eXPRESS Polymer Letters vol. 4, No. 5 (2010) 311-320. (Year: 2010).*

*Primary Examiner* — Hai Vo
(74) *Attorney, Agent, or Firm* — Tully Rinckey PLLC; Steve M. Hoffberg

(57) ABSTRACT

Extruded starch foams are well known as biodegradable alternatives to foamed polystyrene packaging materials. Extruded foams of unmodified starch replacing 1% to 20% of the starch with kraft lignin were prepared. At 10% lignin, there are no deleterious effects on foam density, morphology, compressive strength, or resiliency as compared to a starch extruded foam, yet the foam retains its integrity after immersion for 24 hours in water. At 20% lignin there is a decrease in compressive strength and resiliency. Addition of cellulose fibers restore the mechanical properties but with an increase in density.

17 Claims, 15 Drawing Sheets

(56) References Cited

U.S. PATENT DOCUMENTS

| | | |
|---|---|---|
| 5,248,702 A | 9/1993 | Neumann et al. |
| 5,272,181 A | 12/1993 | Boehmer et al. |
| 5,295,540 A | 3/1994 | Djabbarah et al. |
| 5,308,879 A | 5/1994 | Akamatu et al. |
| 5,315,782 A | 5/1994 | Barclay et al. |
| 5,352,709 A | 10/1994 | Tarrant et al. |
| 5,385,764 A | 1/1995 | Andersen et al. |
| 5,399,284 A | 3/1995 | Schreiber |
| 5,405,564 A | 4/1995 | Stepto et al. |
| 5,407,722 A | 4/1995 | Peake, III et al. |
| 5,432,000 A | 7/1995 | Young, Sr. et al. |
| 5,437,924 A | 8/1995 | Decker, III et al. |
| 5,449,530 A | 9/1995 | Peake, III et al. |
| 5,452,648 A | 9/1995 | Hohler et al. |
| 5,476,621 A | 12/1995 | Kustner |
| 5,484,895 A | 1/1996 | Meister et al. |
| 5,492,741 A | 2/1996 | Akao et al. |
| 5,498,478 A | 3/1996 | Hansen et al. |
| 5,506,046 A | 4/1996 | Andersen et al. |
| 5,506,277 A | 4/1996 | Griesbach, III |
| 5,508,072 A | 4/1996 | Andersen et al. |
| 5,514,430 A | 5/1996 | Andersen et al. |
| 5,545,450 A | 8/1996 | Andersen et al. |
| 5,552,175 A | 9/1996 | Camburn |
| 5,554,660 A | 9/1996 | Altieri et al. |
| 5,580,409 A | 12/1996 | Andersen et al. |
| 5,582,670 A | 12/1996 | Andersen et al. |
| 5,609,093 A | 3/1997 | Hohler et al. |
| 5,612,385 A | 3/1997 | Ceaser et al. |
| 5,614,307 A | 3/1997 | Andersen et al. |
| 5,618,341 A | 4/1997 | Andersen et al. |
| 5,626,954 A | 5/1997 | Andersen et al. |
| 5,631,053 A | 5/1997 | Andersen et al. |
| 5,658,603 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,663,216 A | 9/1997 | Tomka |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,536 A | 1/1998 | Tomka |
| 5,707,474 A | 1/1998 | Andersen et al. |
| 5,709,227 A | 1/1998 | Arzonico et al. |
| 5,709,827 A | 1/1998 | Andersen et al. |
| 5,709,913 A | 1/1998 | Andersen et al. |
| 5,716,675 A | 2/1998 | Andersen et al. |
| 5,720,913 A | 2/1998 | Andersen et al. |
| 5,730,824 A | 3/1998 | Spence et al. |
| 5,733,590 A | 3/1998 | Holladay |
| 5,736,209 A | 4/1998 | Andersen et al. |
| 5,738,921 A | 4/1998 | Andersen et al. |
| 5,756,194 A | 5/1998 | Shogren et al. |
| 5,756,556 A | 5/1998 | Tsai et al. |
| 5,766,525 A | 6/1998 | Andersen et al. |
| 5,766,529 A | 6/1998 | Franke et al. |
| 5,766,749 A | 6/1998 | Kakinoki et al. |
| 5,767,168 A | 6/1998 | Dyer et al. |
| 5,776,388 A | 7/1998 | Andersen et al. |
| 5,779,960 A | 7/1998 | Berlowitz-Tarrant et al. |
| 5,783,126 A | 7/1998 | Andersen et al. |
| 5,800,647 A | 9/1998 | Andersen et al. |
| 5,800,756 A | 9/1998 | Andersen et al. |
| 5,801,207 A | 9/1998 | Bastioli et al. |
| 5,810,961 A | 9/1998 | Andersen et al. |
| 5,830,305 A | 11/1998 | Andersen et al. |
| 5,830,548 A | 11/1998 | Andersen et al. |
| 5,840,777 A | 11/1998 | Eagles et al. |
| 5,843,544 A | 12/1998 | Andersen et al. |
| 5,849,155 A | 12/1998 | Gasland |
| 5,851,634 A | 12/1998 | Andersen et al. |
| 5,853,050 A | 12/1998 | Kittle |
| 5,854,345 A | 12/1998 | Xu et al. |
| 5,855,217 A | 1/1999 | John |
| 5,858,889 A | 1/1999 | Chin-San |
| 5,861,216 A | 1/1999 | Doane et al. |
| 5,863,342 A | 1/1999 | Tsai et al. |
| 5,879,722 A | 3/1999 | Andersen et al. |
| 5,897,944 A | 4/1999 | Loercks et al. |
| 5,910,350 A | 6/1999 | Loracks et al. |
| 5,928,741 A | 7/1999 | Andersen et al. |
| 5,958,589 A | 9/1999 | Glenn et al. |
| 5,976,235 A | 11/1999 | Andersen et al. |
| 5,981,452 A | 11/1999 | Schrader et al. |
| 6,004,637 A | 12/1999 | Reichenecker |
| 6,025,417 A | 2/2000 | Willett et al. |
| 6,030,673 A | 2/2000 | Andersen et al. |
| 6,040,063 A | 3/2000 | Doane et al. |
| 6,062,228 A | 5/2000 | Loercks et al. |
| 6,083,586 A | 7/2000 | Andersen et al. |
| 6,107,371 A | 8/2000 | Roesser et al. |
| 6,136,097 A | 10/2000 | Lorcks et al. |
| 6,146,573 A | 11/2000 | Shogren et al. |
| 6,168,857 B1 | 1/2001 | Andersen et al. |
| 6,180,037 B1 | 1/2001 | Andersen et al. |
| 6,184,261 B1 | 2/2001 | Biby et al. |
| 6,197,355 B1 | 3/2001 | Zietlow et al. |
| 6,200,404 B1 | 3/2001 | Andersen et al. |
| 6,201,034 B1 | 3/2001 | Warzelhan et al. |
| 6,231,960 B1 | 5/2001 | Dyer et al. |
| 6,231,970 B1 | 5/2001 | Andersen et al. |
| 6,235,815 B1 | 5/2001 | Loercks et al. |
| 6,261,679 B1 | 7/2001 | Chen et al. |
| 6,284,359 B1 | 9/2001 | Rose et al. |
| 6,365,079 B1 | 4/2002 | Winkler et al. |
| 6,406,649 B1 | 6/2002 | Fisk |
| 6,458,858 B1 | 10/2002 | Braun et al. |
| 6,472,497 B2 | 10/2002 | Loercks et al. |
| 6,489,040 B1 | 12/2002 | Rohlf et al. |
| 6,497,899 B2 | 12/2002 | Thombre et al. |
| 6,500,463 B1 | 12/2002 | van Lengerich |
| 6,509,322 B2 | 1/2003 | Benedetti et al. |
| 6,521,147 B1 | 2/2003 | Arentsen et al. |
| 6,524,486 B2 | 2/2003 | Borodyanski et al. |
| 6,566,419 B2 | 5/2003 | Denesuk |
| 6,603,054 B2 | 8/2003 | Chen et al. |
| 6,627,752 B1 | 9/2003 | Billmers et al. |
| 6,723,264 B1 | 4/2004 | Bussey, Jr. et al. |
| 6,750,262 B1 | 6/2004 | Hahnle et al. |
| 6,756,428 B2 | 6/2004 | Denesuk |
| 6,761,550 B2 | 7/2004 | Zietlow et al. |
| 6,783,587 B2 | 8/2004 | Sethuraman et al. |
| 6,787,245 B1 | 9/2004 | Hayes |
| 6,805,823 B2 | 10/2004 | Franke et al. |
| 6,878,199 B2 | 4/2005 | Bowden et al. |
| 6,893,527 B1 | 5/2005 | Doane et al. |
| 6,905,719 B2 | 6/2005 | Wang et al. |
| 6,958,369 B2 | 10/2005 | Berger et al. |
| 7,029,620 B2 | 4/2006 | Gordon et al. |
| 7,067,651 B2 | 6/2006 | Poovarodom et al. |
| 7,083,673 B2 | 8/2006 | Bowden et al. |
| RE39,339 E | 10/2006 | Andersen et al. |
| 7,135,063 B2 | 11/2006 | Franke et al. |
| 7,138,078 B2 | 11/2006 | Gotoh |
| 7,144,632 B2 | 12/2006 | Hayes |
| 7,144,972 B2 | 12/2006 | Hayes |
| 7,193,029 B2 | 3/2007 | Hayes |
| 7,201,923 B1 | 4/2007 | van Lengerich |
| 7,220,815 B2 | 5/2007 | Hayes |
| 7,288,277 B2 | 10/2007 | Zhao et al. |
| 7,332,214 B2 | 2/2008 | Ozasa et al. |
| 7,358,325 B2 | 4/2008 | Hayes |
| 7,384,588 B2 | 6/2008 | Gordon et al. |
| 7,393,492 B2 | 7/2008 | Errington et al. |

(56) References Cited

U.S. PATENT DOCUMENTS

| | | |
|---|---|---|
| 7,431,986 B2 | 10/2008 | Van Lengerich et al. |
| 7,452,927 B2 | 11/2008 | Hayes |
| 7,455,873 B2 | 11/2008 | Zietlow et al. |
| 7,485,689 B2 | 2/2009 | Stevens et al. |
| 7,629,405 B2 | 12/2009 | Narayan et al. |
| 7,638,560 B2 | 12/2009 | Narayan et al. |
| 7,648,723 B2 | 1/2010 | Zimeri et al. |
| 7,659,316 B2 | 2/2010 | Kittle et al. |
| 7,781,539 B2 | 8/2010 | Whitehouse |
| 7,803,413 B2 | 9/2010 | van Lengerich et al. |
| 7,803,414 B2 | 9/2010 | Van Lengerich et al. |
| 7,854,994 B2 | 12/2010 | Henderson-Rutgers et al. |
| 7,867,961 B2 | 1/2011 | Tobita |
| 7,888,405 B2 | 2/2011 | Gohil et al. |
| 7,901,575 B2 | 3/2011 | Reyes |
| 7,928,167 B2 | 4/2011 | Whitehouse |
| 7,960,326 B2 | 6/2011 | Ribble et al. |
| 7,967,904 B2 | 6/2011 | Bowden et al. |
| 7,981,338 B2 | 7/2011 | Franke et al. |
| 7,985,566 B2 | 7/2011 | Aoshima et al. |
| 7,985,794 B2 | 7/2011 | Narayan et al. |
| 8,003,719 B2 | 8/2011 | Padwa |
| 8,021,864 B2 | 9/2011 | Aoshima et al. |
| 8,028,803 B1 | 10/2011 | Englert |
| 8,029,636 B2 | 10/2011 | Wycech |
| 8,048,383 B2 | 11/2011 | Tonkovich et al. |
| 8,142,831 B2 | 3/2012 | Van Lengerich et al. |
| 8,163,309 B2 | 4/2012 | Glenn et al. |
| 8,163,324 B2 | 4/2012 | Zimeri et al. |
| 8,178,323 B2 | 5/2012 | De Vries et al. |
| 8,197,830 B2 | 6/2012 | Helfman et al. |
| 8,298,491 B2 | 10/2012 | Tonkovich et al. |
| 8,308,861 B2 | 11/2012 | Rolland et al. |
| 8,313,757 B2 | 11/2012 | van Lengerich |
| 8,356,578 B2 | 1/2013 | Jenkins et al. |
| 8,357,645 B2 | 1/2013 | Glenn et al. |
| 8,410,200 B2 | 4/2013 | Oakley et al. |
| 8,434,498 B2 | 5/2013 | Sebastian |
| 8,435,354 B2 | 5/2013 | Noda et al. |
| 8,449,665 B2 | 5/2013 | Pal et al. |
| 8,470,192 B2 | 6/2013 | Quee et al. |
| 8,476,375 B2 | 7/2013 | Backer et al. |
| 8,524,790 B2 | 9/2013 | Lee et al. |
| 8,530,557 B2 | 9/2013 | Noda et al. |
| 8,547,524 B2 | 10/2013 | Roberts et al. |
| 8,563,065 B2 | 10/2013 | Zimeri et al. |
| 8,569,417 B2 | 10/2013 | Backer et al. |
| 8,586,643 B2 | 11/2013 | Lu et al. |
| 8,603,447 B2 | 12/2013 | Mueller et al. |
| 8,608,991 B2 | 12/2013 | Gawryla et al. |
| 8,673,237 B2 | 3/2014 | Schalkhammer |
| 8,691,046 B2 | 4/2014 | Jorgenson et al. |
| 8,710,212 B2 | 4/2014 | Thibodeau et al. |
| 8,721,943 B2 | 5/2014 | Moore et al. |
| 8,721,974 B2 | 5/2014 | Tonkovich et al. |
| 8,726,444 B2 | 5/2014 | Gaines et al. |
| 8,763,192 B2 | 7/2014 | Uchiyama et al. |
| 8,795,745 B2 | 8/2014 | Mentink et al. |
| 8,815,008 B2 | 8/2014 | Drake et al. |
| 8,871,270 B2 | 10/2014 | Zhang et al. |
| 8,927,622 B2 | 1/2015 | Speer et al. |
| 8,932,704 B2 | 1/2015 | Porbeni et al. |
| 8,950,407 B2 | 2/2015 | Sebastian et al. |
| 8,973,588 B2 | 3/2015 | Sebastian et al. |
| 9,000,073 B2 | 4/2015 | Ceulemans et al. |
| 9,018,268 B2 | 4/2015 | Jo et al. |
| 9,045,578 B2 | 6/2015 | Deheunynck et al. |
| 9,056,423 B2 | 6/2015 | Lee et al. |
| 9,080,009 B2 | 7/2015 | Aoshima et al. |
| 9,109,116 B2 | 8/2015 | Villada Castillo et al. |
| 9,119,410 B2 | 9/2015 | Kino et al. |
| 9,119,419 B2 | 9/2015 | Sebastian et al. |
| 9,132,204 B2 | 9/2015 | McKay et al. |
| 9,133,581 B2 | 9/2015 | Devenney et al. |
| 9,179,709 B2 | 11/2015 | Sebastian |
| 9,181,379 B2 | 11/2015 | Backer et al. |
| 9,194,065 B2 | 11/2015 | Moore et al. |
| 9,255,197 B2 | 2/2016 | Leufgens et al. |
| 9,266,088 B2 | 2/2016 | Lipscomb et al. |
| 9,266,089 B2 | 2/2016 | Lipscomb et al. |
| 9,266,090 B2 | 2/2016 | Lipscomb et al. |
| 9,271,927 B2 | 3/2016 | Garcia De Castro Andrews et al. |
| 9,289,012 B2 | 3/2016 | Sebastian et al. |
| 9,296,934 B2 | 3/2016 | Quee et al. |
| 9,339,474 B2 | 5/2016 | Muller et al. |
| 9,353,297 B2 | 5/2016 | Jorgenson et al. |
| 2001/0014388 A1 | 8/2001 | Bastioli et al. |
| 2001/0024716 A1 | 9/2001 | Chen et al. |
| 2001/0048176 A1 | 12/2001 | Franke et al. |
| 2002/0028857 A1 | 3/2002 | Holy |
| 2002/0065340 A1 | 5/2002 | Denesuk |
| 2002/0077016 A1 | 6/2002 | Fischer |
| 2002/0079270 A1 | 6/2002 | Borodyanski et al. |
| 2002/0094885 A1 | 7/2002 | Finkel |
| 2002/0110634 A1 | 8/2002 | Zietlow et al. |
| 2002/0132790 A1 | 9/2002 | Benedetti et al. |
| 2002/0135097 A1 | 9/2002 | Franke et al. |
| 2002/0179486 A1 | 12/2002 | Hurwitz et al. |
| 2002/0197354 A1 | 12/2002 | Wang et al. |
| 2003/0047110 A1 | 3/2003 | Poovarodom et al. |
| 2003/0107145 A1 | 6/2003 | Ozasa et al. |
| 2003/0125482 A1 | 7/2003 | Stevens et al. |
| 2003/0139491 A1 | 7/2003 | Denesuk |
| 2003/0140794 A1 | 7/2003 | Wang et al. |
| 2003/0177532 A1 | 9/2003 | Burrell et al. |
| 2003/0201579 A1 | 10/2003 | Gordon et al. |
| 2003/0203196 A1 | 10/2003 | Trokhan et al. |
| 2003/0216492 A1 | 11/2003 | Bowden et al. |
| 2003/0220039 A1 | 11/2003 | Chen et al. |
| 2004/0017017 A1 | 1/2004 | Van Lengerich et al. |
| 2004/0024102 A1 | 2/2004 | Hayes et al. |
| 2004/0045481 A1 | 3/2004 | Sethuraman et al. |
| 2004/0048759 A1 | 3/2004 | Ribble et al. |
| 2004/0063801 A1 | 4/2004 | Roehm |
| 2004/0076715 A1 | 4/2004 | Parthasarathy |
| 2004/0105923 A1 | 6/2004 | O'Connell |
| 2004/0126571 A1 | 7/2004 | Bordener |
| 2004/0131663 A1 | 7/2004 | Walacavage et al. |
| 2004/0197455 A1 | 10/2004 | Nie et al. |
| 2004/0209701 A1 | 10/2004 | Finkel |
| 2004/0247761 A1 | 12/2004 | Zietlow et al. |
| 2004/0247807 A1 | 12/2004 | Annan et al. |
| 2004/0254332 A1 | 12/2004 | Hayes |
| 2005/0027098 A1 | 2/2005 | Hayes |
| 2005/0029703 A1 | 2/2005 | Franke et al. |
| 2005/0067082 A1 | 3/2005 | Mowry |
| 2005/0070703 A1 | 3/2005 | Muller et al. |
| 2005/0118405 A1 | 6/2005 | Gotoh |
| 2005/0120915 A1 | 6/2005 | Bowden et al. |
| 2005/0158533 A1 | 7/2005 | Chapman et al. |
| 2005/0171250 A1 | 8/2005 | Hayes |
| 2005/0266230 A1 | 12/2005 | Hill et al. |
| 2005/0281999 A1 | 12/2005 | Hofmann et al. |
| 2006/0009609 A1 | 1/2006 | Hayes |
| 2006/0009610 A1 | 1/2006 | Hayes |
| 2006/0009611 A1 | 1/2006 | Hayes |
| 2006/0036012 A1 | 2/2006 | Hayes et al. |
| 2006/0061016 A1 | 3/2006 | Gordon et al. |
| 2006/0062990 A1 | 3/2006 | Gotoh |
| 2006/0135026 A1 | 6/2006 | Arendt et al. |
| 2006/0135668 A1 | 6/2006 | Hayes |
| 2006/0204560 A1 | 9/2006 | Walacavage et al. |
| 2006/0255507 A1 | 11/2006 | Bowden et al. |
| 2006/0279014 A1 | 12/2006 | Balchin et al. |
| 2007/0004827 A1 | 1/2007 | Franke et al. |
| 2007/0007495 A1 | 1/2007 | Hayes |
| 2007/0048490 A1 | 3/2007 | Yu et al. |
| 2007/0059513 A1 | 3/2007 | Yu et al. |
| 2007/0090553 A1 | 4/2007 | Bordener |
| 2007/0098853 A1 | 5/2007 | van Lengerich et al. |
| 2007/0098854 A1 | 5/2007 | Van Lengerich et al. |
| 2007/0122584 A1 | 5/2007 | Song et al. |
| 2007/0141096 A1 | 6/2007 | Van Lengerich |
| 2007/0148384 A1 | 6/2007 | Bowden et al. |

(56) References Cited

U.S. PATENT DOCUMENTS

| | | |
|---|---|---|
| 2007/0149629 A1 | 6/2007 | Donovan et al. |
| 2007/0163737 A1 | 7/2007 | Johansson et al. |
| 2007/0166532 A1 | 7/2007 | Bordener |
| 2007/0176137 A1 | 8/2007 | Quee et al. |
| 2007/0184742 A1 | 8/2007 | Coulson et al. |
| 2007/0191565 A1 | 8/2007 | Stevens et al. |
| 2007/0213244 A1 | 9/2007 | Tobita |
| 2007/0254060 A1 | 11/2007 | Errington et al. |
| 2007/0254970 A1 | 11/2007 | Kitamura |
| 2007/0256736 A1 | 11/2007 | Tonkovich et al. |
| 2008/0003906 A1 | 1/2008 | Hill et al. |
| 2008/0033093 A1 | 2/2008 | Menceloglu et al. |
| 2008/0128657 A1 | 6/2008 | Muldoon |
| 2008/0131538 A1 | 6/2008 | Glenn et al. |
| 2008/0206155 A1 | 8/2008 | Tamarkin et al. |
| 2008/0206401 A1 | 8/2008 | Parthasarathy |
| 2008/0255255 A1 | 10/2008 | Kittle et al. |
| 2009/0012210 A1 | 1/2009 | Speer et al. |
| 2009/0044902 A1 | 2/2009 | Wycech |
| 2009/0110942 A1 | 4/2009 | Henderson-Rutgers et al. |
| 2009/0123767 A1 | 5/2009 | Gohil et al. |
| 2009/0134085 A1 | 5/2009 | Reyes |
| 2009/0162683 A1 | 6/2009 | Douard |
| 2009/0170971 A1 | 7/2009 | Lee et al. |
| 2009/0171037 A1 | 7/2009 | Aoshima et al. |
| 2009/0208685 A1 | 8/2009 | Rivers et al. |
| 2009/0220654 A1 | 9/2009 | Kino et al. |
| 2009/0239963 A1 | 9/2009 | Lu et al. |
| 2009/0258172 A1 | 10/2009 | Bowden et al. |
| 2009/0308001 A1 | 12/2009 | Wu et al. |
| 2009/0312215 A1 | 12/2009 | Glenn et al. |
| 2009/0312462 A1 | 12/2009 | Oakley et al. |
| 2009/0324913 A1 | 12/2009 | Bastioli et al. |
| 2010/0029928 A1 | 2/2010 | De Vries et al. |
| 2010/0119801 A1 | 5/2010 | Errington et al. |
| 2010/0168261 A1 | 7/2010 | Hung et al. |
| 2010/0199884 A1 | 8/2010 | Rocha Bastos et al. |
| 2010/0210745 A1 | 8/2010 | McDaniel et al. |
| 2010/0233146 A1 | 9/2010 | McDaniel |
| 2011/0009531 A1 | 1/2011 | Aoshima et al. |
| 2011/0020520 A1 | 1/2011 | Van Lengerich et al. |
| 2011/0036366 A1 | 2/2011 | Sebastian |
| 2011/0065841 A1 | 3/2011 | Quee et al. |
| 2011/0067582 A1 | 3/2011 | Reyes |
| 2011/0097279 A1 | 4/2011 | Tamarkin et al. |
| 2011/0097530 A1 | 4/2011 | Gohil et al. |
| 2011/0120645 A1 | 5/2011 | Jorgenson et al. |
| 2011/0129575 A1 | 6/2011 | Li et al. |
| 2011/0151737 A1 | 6/2011 | Moore et al. |
| 2011/0151738 A1 | 6/2011 | Moore et al. |
| 2011/0159267 A1 | 6/2011 | Lee et al. |
| 2011/0178198 A1 | 7/2011 | Backer et al. |
| 2011/0183380 A1 | 7/2011 | El-Tahlawy et al. |
| 2011/0190411 A1 | 8/2011 | Backer et al. |
| 2011/0240064 A1 | 10/2011 | Wales et al. |
| 2011/0247894 A1 | 10/2011 | Englert |
| 2011/0250626 A1 | 10/2011 | Williams et al. |
| 2011/0256362 A1 | 10/2011 | Mikkonen et al. |
| 2011/0262377 A1 | 10/2011 | McKay et al. |
| 2011/0281485 A1 | 11/2011 | Rolland et al. |
| 2011/0288207 A1 | 11/2011 | Aoshima et al. |
| 2011/0306692 A1 | 12/2011 | Kotani et al. |
| 2012/0000479 A1 | 1/2012 | Sebastian et al. |
| 2012/0000480 A1 | 1/2012 | Sebastian et al. |
| 2012/0000481 A1 | 1/2012 | Potter et al. |
| 2012/0003360 A1 | 1/2012 | Barrett et al. |
| 2012/0017925 A1 | 1/2012 | Sebastian et al. |
| 2012/0058063 A1 | 3/2012 | Tonkovich et al. |
| 2012/0086139 A1 | 4/2012 | Gawryla et al. |
| 2012/0097067 A1 | 4/2012 | Fascio |
| 2012/0097194 A1 | 4/2012 | McDaniel et al. |
| 2012/0167805 A1 | 7/2012 | Wittbold et al. |
| 2012/0171294 A1 | 7/2012 | Glenn et al. |
| 2012/0183452 A1 | 7/2012 | Schalkhammer |
| 2012/0207692 A1 | 8/2012 | Mueller et al. |
| 2012/0207693 A1 | 8/2012 | Mueller et al. |
| 2012/0219589 A1 | 8/2012 | Garcia De Castro Andrews et al. |
| 2012/0246850 A1 | 10/2012 | Gaines et al. |
| 2012/0246853 A1 | 10/2012 | Uchiyama et al. |
| 2012/0246854 A1 | 10/2012 | Uchiyama et al. |
| 2012/0283346 A1 | 11/2012 | Backer et al. |
| 2012/0283362 A1 | 11/2012 | Backer et al. |
| 2012/0283388 A1 | 11/2012 | Backer et al. |
| 2012/0289620 A1 | 11/2012 | Deheunynck et al. |
| 2012/0315225 A1 | 12/2012 | Porbeni et al. |
| 2013/0030145 A1 | 1/2013 | Aoshima et al. |
| 2013/0052149 A1 | 2/2013 | Tonkovich et al. |
| 2013/0065055 A1 | 3/2013 | Bastioli et al. |
| 2013/0078445 A1 | 3/2013 | Ramesh et al. |
| 2013/0108737 A1 | 5/2013 | Van Lengerich |
| 2013/0116352 A1 | 5/2013 | Jo et al. |
| 2013/0131222 A1 | 5/2013 | Gross |
| 2013/0171203 A1 | 7/2013 | Rosenblatt et al. |
| 2013/0171393 A1 | 7/2013 | Kannankeril et al. |
| 2013/0171439 A1 | 7/2013 | Shoseyov et al. |
| 2013/0180536 A1 | 7/2013 | Sebastian |
| 2013/0192783 A1 | 8/2013 | Devenney et al. |
| 2013/0196103 A1 | 8/2013 | Leufgens et al. |
| 2013/0207043 A1 | 8/2013 | Menozzi et al. |
| 2013/0216752 A1 | 8/2013 | Menozzi et al. |
| 2013/0256939 A1 | 10/2013 | Devenney et al. |
| 2013/0264508 A1 | 10/2013 | Quee et al. |
| 2013/0288556 A1 | 10/2013 | Moore et al. |
| 2013/0303623 A1 | 11/2013 | Barnscheid et al. |
| 2014/0033950 A1 | 2/2014 | Saha |
| 2014/0069344 A1 | 3/2014 | Lipscomb et al. |
| 2014/0069345 A1 | 3/2014 | Lipscomb et al. |
| 2014/0069346 A1 | 3/2014 | Lipscomb et al. |
| 2014/0079933 A1 | 3/2014 | Errington et al. |
| 2014/0196631 A1 | 7/2014 | McDaniel |
| 2014/0210141 A1 | 7/2014 | Moore et al. |
| 2014/0262016 A1 | 9/2014 | Combs et al. |
| 2014/0262017 A1 | 9/2014 | Combs et al. |
| 2014/0262018 A1 | 9/2014 | Combs et al. |
| 2014/0272131 A1 | 9/2014 | Combs et al. |
| 2014/0306367 A1 | 10/2014 | Lee et al. |
| 2014/0308331 A1 | 10/2014 | Kohn et al. |
| 2014/0315008 A1 | 10/2014 | Francis |
| 2014/0329937 A1 | 11/2014 | Jorgenson et al. |
| 2015/0054190 A1 | 2/2015 | Huisman et al. |
| 2015/0065591 A1 | 3/2015 | Liao et al. |
| 2015/0090156 A1 | 4/2015 | Combs et al. |
| 2015/0125498 A1 | 5/2015 | Dejmek et al. |
| 2015/0143806 A1 | 5/2015 | Friesth |
| 2015/0145164 A1 | 5/2015 | Lipscomb |
| 2015/0181832 A1 | 7/2015 | Lipscomb |
| 2015/0191607 A1 | 7/2015 | McDaniel |
| 2015/0232703 A1 | 8/2015 | Nelson et al. |
| 2015/0238931 A1 | 8/2015 | Lipscomb et al. |
| 2015/0266652 A1 | 9/2015 | Peppou |
| 2015/0272208 A1 | 10/2015 | Sebastian et al. |
| 2015/0291857 A1 | 10/2015 | Saha |
| 2015/0307400 A1 | 10/2015 | Devenney et al. |
| 2015/0307754 A1 | 10/2015 | Combs et al. |
| 2015/0313763 A1 | 11/2015 | Bagger-Sjoback et al. |
| 2015/0361309 A1 | 12/2015 | Combs et al. |
| 2015/0361310 A1 | 12/2015 | Combs et al. |
| 2015/0361311 A1 | 12/2015 | Combs et al. |
| 2015/0374869 A1 | 12/2015 | McKay et al. |
| 2016/0045637 A1 | 2/2016 | Rosenblatt et al. |
| 2016/0052692 A1 | 2/2016 | Branham |
| 2016/0073686 A1 | 3/2016 | Crooks |
| 2016/0089829 A1 | 3/2016 | Derkman et al. |
| 2016/0122515 A1 | 5/2016 | Karampelas |
| 2016/0157647 A1 | 6/2016 | Rampersad |
| 2016/0165834 A1 | 6/2016 | Lipscomb et al. |
| 2016/0165835 A1 | 6/2016 | Lipscomb et al. |
| 2016/0168363 A1 | 6/2016 | Nelson et al. |
| 2018/0002451 A1* | 1/2018 | Ge .................. C08B 30/20 |

* cited by examiner

Powder X-ray diffraction patterns of foams of starch and starch-lignin

Water absorption in compression molded starch and starch-lignin

Unit densities of the samples described in Table 1

Resiliencies of the samples described in Table 1. The dark shaded bars are for samples containing 20% lignin Compressive strengths of the samples described in Table 1. The dark shaded bars are those of samples containing 10% cellulose fibers Compressive strength as a function of density A ln-ln plot of the weight of water absorbed ($m_1$) relative to the dry weight ($m_2$) versus time in seconds; sample 16 (▲), sample 18 (■), sample 21 (♦)

A ln-ln plot of the weight of water absorbed ($m_1$) per unit surface area ($cm^2$) versus time in seconds; sample 16 (▲), sample 18 (■), sample 21 (♦)

Mass of water absorbed per unit surface area as a function of time, as expressed in Equation (1); sample 16 (▲), sample 18 (■), sample 21 (♦); lines show fitted values

EXTRUDED STARCH-LIGNIN FOAMS

CROSS REFERENCE TO RELATED APPLICATIONS

The present application is a non-provisional of, and claims benefit of priority under 35 U.S.C. § 119(e) from, U.S. Provisional Patent Application No. 62/182,237 filed Jun. 19, 2015, the entirety of which is expressly incorporated herein by reference.

FIELD OF THE INVENTION

The present invention relates to the field of biomaterials, and more particularly extruded starch-lignin foam, preferably in a form usable as a packaging material.

BACKGROUND OF THE INVENTION

It has been known that biobased polymer products provide sustainability gains through a reduced dependence on petroleum reserves and if the products are biodegradable they also provide environmental amelioration through increased disposal options and lower levels of greenhouse gases [Chiellini and Solaro, 2003; Wool and Sun, 2005]. Low-cost biodegradable plastics and composites are especially sought for high volume applications where large amounts of material are discarded soon after use, as is the case with many types of packaging and some consumer products.

Expanded, cellular products (foams) make up one segment of packaging materials. Foams are used as a protective packaging material for shipping products; the material may be either of the loose-fill type or shaped. With low density packaging material, less packaging weight is needed, reducing both manufacturing and shipping costs. Expanded polystyrene foam, a commonly used packaging material, has the desirable properties of low density, high resiliency, and good moisture and water resistance. Foamed polystyrene, however, is produced from non-renewable, petroleum-based feedstocks. Moreover, it is not biodegradable, which presents a disposal challenge for the large volume of packaging foam that is discarded, typically into landfills and usually soon after use.

Starch-based materials have been of interest because of the generally low cost of starch, and because thermoplastic starch (Avérous, 2004) can be processed with conventional means such as extrusion and injection molding. Starch is both biobased and biodegradable. Various approaches have been used to produce extruded starch foams with properties required for packaging applications. These approaches include the use of high-amylose (45-70%) starch, chemically modified starch, and/or polymer additives.

U.S. Pat. No. 5,208,267, for example, reports the use of blends of normal or high-amylose starch with polyglycols. U.S. Pat. No. 5,272,181 describes extruded foams based on graft copolymers of starch with methyl acrylate. Shogren (1996) reports the extrusion of high-amylose starch acetate foams. U.S. Pat. No. 5,756,556 used chemically modified high-amylose starch, alone or blended with other polymers. U.S. Pat. No. 5,801,207 describes foams based on blends of starch, including chemically modified high-amylose starch, with various polymers, including poly(vinyl alcohol). U.S. Pat. No. 6,107,371 describes the use of chemically modified high-amylose starch with polymer additives including poly (vinyl alcohol). Fang and Hanna (2001) prepared foams using blends of starch and commercial Mater-Bi®. U.S. Pat. No. 6,365,079 describes the extrusion of starch with hydroxy-functionalized polyetheramine. Xu and Hanna (2005) extruded acetylated high-amylose starch foams using water or ethanol. Guan et al. (2005) prepared foams using acetylated native corn starch, high-amylose corn starch or potato starch, blended with polylactic acid and extruded with ethanol. Nabar et al. (2006a) used blends of high-amylose starch and poly(hydroxyl aminoether).

Some packaging applications require foams to be moisture and water resistant, as when products are shipped in humid climates. Foams prepared with chemically unmodified starch and without additives are not suitable for packaging materials where water/moisture resistance is a required property. Various approaches have been used to produce extruded biodegradable and water resistant foams. These approaches include the use of chemically modified starch and/or additives. (U.S. Pat. Nos. 5,208,267; 5,272, 181; 5,756,556; 5,801,207; 6,107,371; 6,365,079) A drawback of using chemically modified starch is the added cost.

U.S. Pat. No. 4,863,655, for example, describes the extrusion of high-amylose starch, modified or unmodified, with or without the addition of poly(vinyl alcohol) to produce a biodegradable low-density foam packaging material, but U.S. Pat. No. 5,043,196 (a continuation-in-part of U.S. Pat. No. 4,863,655) reveals that the invention described therein has poor water resistance and disintegrates in water in a matter of minutes.

U.S. Pat. No. 5,554,660 uses blends of high-amylose starch and starch esters to produce water resistant foams. U.S. Pat. No. 5,854,345 describes water resistant foams made from blends of starch with hydroxy functional polyesters. U.S. Pat. No. 6,184,261 blends high-amylose starch with other biodegradable polymers, including poly(lactic acid), to increase the water resistance of foamed materials. Willett and Shogren (2002) measured the water resistance of foams made from normal corn starch blended with other polymers. Guan and Hanna (2004b) report the water resistance of blends of high-amylose starch with starch acetate. Xu et al. (2005) describe the reduced water solubility of starch acetate foams. Nabar et al. (2006b) blended starch with various water-resistant biodegradable polymers to improve the hydrophobic character of the foams. Zhang and Sun (2007) measured the effect on water resistance of blending starch with polylactic acid. Arif et al. (2007) describe the properties, including water resistance, of commercial Green Cell® starch based foam, and Sjöqvist et al. (2010) report the extrusion, water resistance, and other properties of various potato starch foams.

Resistance to water and moisture absorption is only one desirable property in packaging applications. Other desirable properties include low density, high resilience, and high compressive strength.

Starch foams can also be produced with a technique similar to compression molding, whereby a mixture of starch, water, and additives is deposited into heated molds (Tiefenbacher, 1993). Excess water is vented as steam as the mixture expands and fills the mold cavity. A small amount of the mixture tends to be forced through the vents, which builds pressure inside the mold and produces foaming (Tiefenbacher. 1993). The properties of these "baked" foams and their dependence on composition and processing have been studied (Shogren et at, 1998; Glenn et al., 2001; Shogren et al., 2002; Lawton et al., 2004), largely with the aim of improving mechanical properties and moisture resistance.

There is also growing interest in lignin-based materials. Lignin is an abundant renewable natural resource. A byproduct of paper manufacture, lignin is considered a fairly intractable waste material and is usually burned as fuel for lack of higher-value uses. Lignin is also produced as a byproduct in the refining process by which cellulose is isolated from lignocellulosic feedstocks. Starch-lignin materials can therefore be envisioned as becoming integrated into the production of bioethanol.

The properties and uses of lignin have been reviewed (Glasser et al., 2000; Hu, 2002). Kumar et al. (2009) have reviewed applications of lignin combined with other polymers. Baumberger (2002) has reviewed applications of lignin specifically in starch-lignin films.

Stevens et al. (2007) have examined thermoplastic starch-kraft lignin-glycerol blends prepared by film casting and extrusion. Stevens et al. (2010) prepared starch-lignin foams prepared with a technique similar to compression molding, whereby starch, water, and additives are heated in molds.

Starch-lignin foams have not previously been prepared by extrusion. The major applications for extruded starch-lignin foams are biodegradable packaging materials for single or short-term use, as alternatives to recalcitrant foamed polystyrene.

The known starch-lignin foam therefore possesses properties of interest. The process for production does not lend itself to continuous production streams, and the inhomogeneous product with a distinct outer layer represents characteristics subject to further investigation.

The major applications for starch-lignin foams would be packaging containers for single or short-term use, as biodegradable alternatives to foamed polystyrene.

Lignin is soluble in aqueous solution only at high pH. In studies of starch-lignin cast films (Stevens et A, 2007), ammonium hydroxide was used to raise the pH of the casting solution and was found to be a requirement for obtaining viable films. Preparing starch-lignin films by extrusion, on the other hand, had no significant high-pH requirement (Stevens et A, 2007). Lignin was found to have little effect on foam density. Stevens et al. proposed that extrusion may lead to lower densities in starch-lignin foams than foams obtained by compression molding, but without testing or developing a process to extrude the mixture.

SEM images of a starch foam and a starch lignin foam are shown in FIGS. 1A-1D. The features of starch foams (FIG. 1A) have been observed previously (Tiefenbacher, 1993; Shogren et al., 1998). Below a thin surface 'skin' of approximately 100 μma in thickness, there is a region of cellular structure containing 100-200 μm voids. The major internal region of the foam consists of large voids of up to 1 mm in size. The boundaries separating these regions are not sharp, but the combined thickness of the outer skin and smaller voids in the present micrographs is approximately 0.045 cm, similar to what has been observed previously (Tiefenbacher, 1993; Shogren et A, 1998). Starch-lignin foams display the same features (FIG. 1B). Lack of contrast makes the location of the dispersed lignin impossible. Nevertheless, the SEM images show that 20% lignin can be incorporated into starch foams without collapse of the foam and with no major change in morphology.

FIGS. 1C and 1D show enlarged images of the starch and starch lignin compression molded samples, respectively. The walls of the internal cells are approximately 10 μm thick, whether or not the foams contain lignin. Therefore, SEM indicates that replacing 20% of the starch with has no deleterious effect on overall morphology.

X-ray diffraction patterns of the starch and starch lignin compression molded samples are shown in FIG. 2. The significant diffraction maximum at 19.4° and a weaker maximum at 12.7° in both samples indicate the presence of residual structure of the V form of starch (Willett and Shogren, 2002; Shogren et al., 1998; Shogren and Jasberg, 1994). The absence of the B structure indicates that the native structure in the starch granule was destroyed during foam formation. Some of the amylose probably recrystallized into the V form during the cooling (Shogren and Jasberg, 1994).

Differential scanning calorimetry (DSC) shows that the starch foam displays, within the measured temperature range, a broad endothermic peak and a second smaller feature. Peak temperatures were 85±1° C. and 95±2° C., respectively. The integrated area, including both features and averaged over four specimens, corresponds to $\Delta H=2.0\pm0.1$ J/g of dry starch. DSC features observed with starch samples depend on water content, age, source plant, and sample history (Shogren, 1992; Shogren and Jasberg, 1994; Maaruf et al., 2001). The thermal features in the starch foam indicate that heat treatment of starch during foam formation leaves some residual starch structure (Shogren and Jasberg, 1994). XRD analysis indicates that structure to be the V form of amylose. X-ray diffraction analysis indicates the presence of residual structure in both samples, but only the starch sample displays a thermal transition by DSC. This result indicates that, when lignin is present, starch-lignin interactions are sufficient to inhibit the thermal transition.

FIG. 3 shows a plot of in, versus $t^{1/2}$ for a starch sample and starch-lignin sample, with $m_t$ in units of $g/cm^2$ and t in seconds. The behavior is initially linear, but the slopes increase at longer times. The results of this empirical model indicate qualitatively that lignin impedes the absorption of water in the compression molded product. The ratio of the limiting slopes, at short times, is approximately 2:1, indicating a ratio of effective diffusion constants of approximately 4:1. The specimens were cut from the original larger samples, exposing voids along the edges, but for the sample sizes used here, only 10% of the surface area was exposed.

For the starch sample $D=2.68\cdot10^{-6}$ $cm^2/sec$, and for the starch lignin sample $D=0.80\cdot10^{-6}$ $cm^2/sec$. Lignin appears to impede diffusion into the outer layers of the foam but does not affect the diffusion mechanism. The ratio of the two effective diffusion constants is 3.4, indicating a significant improvement in water resistance in the starch-lignin foam. Baumberger et al. (1998), who studied starch-lignin films, also found that lignin improves water resistance, as long as no plasticizer is used. Stevens et al. (2007) found that if glycerol is used to plasticize starch-lignin films, the effect of the glycerol is to reduce or eliminate the hydrophobic effect of lignin.

The load deflection curves for the compression molded starch control samples showed an increase in strain beyond the point of maximum stress; they showed a yield. Beyond the yield, there was an additional strain of approximately 0.2% before the sample broke. On the other hand, foams containing lignin displayed no yield; they broke at the maximum measured stress. Shogren et al. (1998) and Lawton et al. (1999) have shown that starch content, plant source, and moisture content affect the mechanical properties of foams prepared by compression molding. In foams with 20% lignin (prepared with ammonium hydroxide), the ammonium hydroxide had the effect of significantly decreasing flexural strength (99% confidence level), but had no further effect on strain at maximum stress. The modulus of elasticity was larger than the value for the starch control (95% confidence level).

SUMMARY OF THE INVENTION

Low-cost biodegradable plastics and composites are sought for high volume packaging applications where large amounts of material are discarded soon after use. Expanded, cellular products (foams) make up one segment of the packaging market. Foams are used as a protective packaging material for shipping products; the material may be either of the loose-fill type or shaped. With low density packaging material, less packaging weight is needed, reducing both manufacturing and shipping costs. Expanded polystyrene foam, a commonly used packaging material, has the desirable properties of low density, high resiliency, and good moisture and water resistance. Foamed polystyrene, however, is produced from non-renewable, petroleum-based feedstocks. Moreover, it is not biodegradable, which presents a disposal challenge for the large volume of packaging foam that is discarded, typically into landfills and usually soon after use.

It has now been discovered that a biodegradable and water-resistant packaging foam can be prepared by co-extruding unmodified starch and a hydrophobic natural polymeric material that is abundantly available commercially, lignin. Further, it has been discovered that the extrusion processing compatibilizes the two polymeric components. It has further been discovered that the resulting foam retains its integrity after immersion for 24 hours in water.

Applications of the technology are in the production of packaging foams for single or short-term use, as alternatives to recalcitrant foamed polystyrene. Relative to the current technology of manufacturing foamed polystyrene packaging materials, the current technology has the advantage of manufacturing biodegradable foamed packaging materials from renewable resources. The present polymer materials need not be chemically modified prior to manufacture of the foam material, thereby reducing material costs. The present technology has the possibility of providing renewable and degradable foams for large-volume packaging, as replacements for recalcitrant polyolefins such as foamed polystyrene.

The extruded material may also be used as a structural material, which may be used independently or as a composite material. For example, a honeycomb structure may be filled with extruded starch-lignin.

There are ways of blending starch with other polymers to produce packaging foams, such as blends of high-amylose starch and starch esters, blends of high-amylose starch and starch acetate, blends of normal or high-amylose starch with polyglycols, blends of high-amylose starch with polylactic acid, blends of starch with hydroxyl functional polyesters, etc.

One feature of this technology is to provide a packaging material which is biodegradable. Many plastic packaging materials, especially foamed polystyrene, are not biodegradable, which presents disposal problems in applications where large volumes of packaging are used, such as protective packaging and loose fill materials. Another important feature of this technology is to provide a packaging material which is water and moisture resistant.

A biodegradable and water and moisture resistant packaging material is obtained by extrusion expansion of a high amylose starch material. Importantly, the starch need not be chemically modified by derivatization. Prior art shows that underivatized high amylose starch can be extrusion expanded to produce foamed materials, but the resulting material has no resistance to water absorption and quickly disintegrates when immersed in water. According to a known process, water and moisture resistance is imparted to extruded starch foams by chemical derivatization of the starch or the use of polymer additives. Often both methods are used together, whereby additives are combined with chemically modified starch.

The technology produces an expanded, biodegradable starch product with low density and good resilience and compressibility properties. This is accomplished by the extrusion of high amylose starch with lignin, an abundant, commercially available byproduct of paper manufacture. Lignin is considered an intractable waste material and is usually burned as fuel for lack of high-value uses. Lignin is also produced as a byproduct in the refining process by which cellulose is isolated from lignocellulosic feedstocks. Lignin can therefore be envisioned as becoming a more abundant and inexpensive renewable feedstock, and starch-lignin materials can be envisioned as becoming integrated into the production of bioethanol.

The present technology produces foaming materials using blends of starch and lignin, which can have the same or similar properties and functions as other starch-based materials. In addition, the lignin used is a waste by-product of the paper industry and is very inexpensive, its alternate use typically being combustion as a fuel. Note that, if recycled, the product may be reformed into foaming materials or used for other purposes, e.g., as a fuel, fermentation media, etc., and therefore biodegradation is not the only possible disposition. Therefore, the material could be highly cost competitive with the other starch-based foaming materials.

The material density of the foam produced by the technology is greater than the density of other biodegradable packaging foams that are commercially available. The resulting increase in cost per unit volume will tend to be offset by the fact that no chemical modification of the polymeric materials is necessary. This higher density reflects, e.g., as a cost-of-materials issue and as a transportation cost.

It has been found that 10% lignin imparts significant resistance to water absorption in extruded starch foams, relative to extruded unmodified starch foams, without causing any deleterious effects on density, morphology, compressive strength, or resiliency.

Added fibers often improve the mechanical properties of starch foams (Glenn et al., 2001; Shogren et al., 2002; Lawton et al., 2004; Guan and Hanna, 2004a; Carr et al., 2006; Glenn et al., 2007; Müller et al., 2009); here we examined the effect of adding cellulose fibers to some of the samples.

The compressive strength of 10% lignin foams can be increased by the addition of cellulose fibers, but foam density is thereby significantly increased. As is common with foam materials (Christenson, 2000), the simultaneous requirements of low density and adequate strength are at odds with one another and it is necessary to make "trade-off" considerations.

Although starch foams are well known as biodegradable alternatives to foamed polystyrene, starch-lignin foams are less explored. See, Stevens et al. (2010), expressly incorporated herein by reference in its entirety. Lignin is an abundant byproduct of paper manufacture, usually burned as fuel for lack of higher-value uses. Prior starch-kraft lignin foams have been reported using a known technique similar to compression-molding. A composition having 80% starch and 20% lignin has no deleterious effect on density or morphology as indicated by scanning electron microscopy. The molding process produces a thin outer layer of approximately 100 µm which encloses a region of cellular structure containing 100-200 µm voids, with the major internal region of the foam consisting of large voids of up to 1 mm in size. Powder X-ray diffraction of the product showed a residual structure in both starch and starch-lignin foams. Differential scanning calorimetry displayed endothermic transitions in the starch foam but not in the starch-lignin foam, indicating that lignin stabilizes the residual starch structure. The presence of lignin decreases water absorption; diffusion constants for the starch and starch-lignin foams are $2.68 \cdot 10^{-6}$ and $0.80 \cdot 10^{-6}$ cm$^2$/sec, respectively. The flexural strength of the starch-lignin foam is similar to that of foamed polystyrene, the strain at maximum stress is smaller, and the modulus of elasticity is larger.

A mixture of 20% lignin and 80% starch does not prevent foam formation and has no deleterious effect on foam density or morphology as compared to a 100% starch foam, but both compressive strength and resiliency are decreased. Those mechanical properties can be restored with the addition of cellulose fibers, but only with a significant increase in density.

As should be understood, the addition of various materials with known properties, such as carbon nanotubes, or the modification of the components, is possible, but typically such additions or modifications substantially increase cost, and undermine the economical use of the unmodified starch-lignin coextruded expanded material.

In some cases, an antibiotic composition may be added to the mixture, or applied to the exposed surfaces after forming the extrusion, to delay biodegradation and bacterial/fungal growth and incidental fermentation.

The starch is preferably an unmodified high-amylose corn starch. It is of course understood that other types of starch and/or modifications of starch are possible, and may be employed.

The preferred embodiments combine starch and lignin, without polymeric additives.

The present invention provides a biodegradable packaging material comprising an expanded high amylose starch product. More particularly, the invention requires no prior chemical modification of the starch. Some embodiments of the invention are resistant to water absorption, remaining intact after 24 h immersion in water. A preferred product of the invention has low density, good resilience and compressibility, and remains intact after water immersion for more than 24 h.

It is therefore an object to provide a product comprising a starch comprising amylose and amylopectin, and lignin present in a ratio of between about 80:20 to 99:1 having an expanded cellular structure having a uniform distribution of cells throughout. The product may be produced by extruding a mixture of starch and lignin under heat and pressure. In some cases, it may be possible to use 25% or 30% lignin. On the other hand, less than 1% lignin may be insignificant. The starting materials need not be high purity or high quality.

It is also an object to provide a product formed by a process comprising mixing chemically unmodified starch and lignin in an aqueous medium, and extruding the mixture under sufficient heat and pressure to yield an expanded cellular structure having a uniform distribution of cells throughout, a density of less than about 75 kg/m$^3$, and having a sufficient amount of lignin to provide water resistance to retain structural integrity after 1 hour of aqueous immersion.

It is a further object to provide a method of forming a product, comprising: mixing lignin and starch in an aqueous medium; and extruding the lignin-starch mixture under heat and pressure to form an expanded foam. The aqueous medium, e.g., tap water or industrial waste water having non-interfering suspended or dissolved materials, is substantially boiled. Thus, for example, the aqueous solution may include dissolved starch and/or lignin or suspended cellulose fibers.

The expanded product may have a unit density of 31-75 kg/m$^3$, preferably less than 65 kg/m$^3$, and more preferably less than 39 kg/m$^3$. The product may have a resiliency of 38-72%. The product may have a compressive strength of at least 0.10 MPa, for example a compressive strength of 0.10 to 0.18 MPa.

The product may comprise the starch which has approximately 70% by weight amylose. Other starches may be used. For example, a low amylose starch of about 35% amylose, and a high amylose starch with about 95% amylose may be used.

While preferable unmodified, if for no other reason than cost, the starch may be chemically modified. According to a preferred embodiment, the starch-lignin mixture results in water resistance of the extruded product, without need for use of acetylated starch.

The lignin may be chemically unmodified or chemically modified.

The product may comprise 1-10% by weight lignin, the product having a unit density of 31-39 kg/m$^3$, a resiliency of 63-72%, and a compressive strength of 0.14-0.18 MPa.

The product may also comprise at least 10% by weight lignin, wherein the product remains intact after immersion in water for longer than 24 h.

The product may have a unit density of about 39 kg/m$^3$, a resiliency of about 63%, and a compressive strength of about 0.18 MPa.

The product may comprise at least one filler which does not chemically interact with the starch or lignin. Chemically interactive additional components may also be used.

The product may comprise 1-18% by weight lignin and further comprise 5-10% by weight cellulose fibers, the expanded product having a unit density of 36-61 kg/m$^3$, a resiliency of 56-67%, and a compressive strength of 0.18-0.32 MPa.

The product may comprise carbon fibers, e.g., carbon nanotubes, pyrolized carbon fibers, pyrolized cellulose fibers, etc. The product may comprise up to about 10% by weight carbon fibers, and higher loading may be possible with changes in material properties, such as for example, increased density, or reduced strength.

The product may comprise 1-5% by weight lignin and further comprise 5% by weight cellulose fibers, the expanded product having a unit density of 36-37 kg/m$^3$, a resiliency of about 61-67%, and a compressive strength of 0.16-18 MPa.

The product may comprise between 9-18% by weight lignin, and further comprising 10% by weight cellulose fibers, the expanded product remaining intact after immersion in water for longer than 24 h.

The expanded foam preferably has a cellular structure having a uniform distribution of cells and cell sizes along a cross section thereof. Preferably, the product does not have a densified skin or significantly higher statistical density near the surface than in the interior. For example, a density variation across the extruded cross section may vary less than about 2:1.

The product may have a density less than about 65 kg/m$^3$ and sufficient resistance to water to retain structural integrity after 12 hours of aqueous immersion.

DETAILED DESCRIPTION OF THE PREFERRED EMBODIMENTS

Materials and Sample Preparation

Figure 1A:
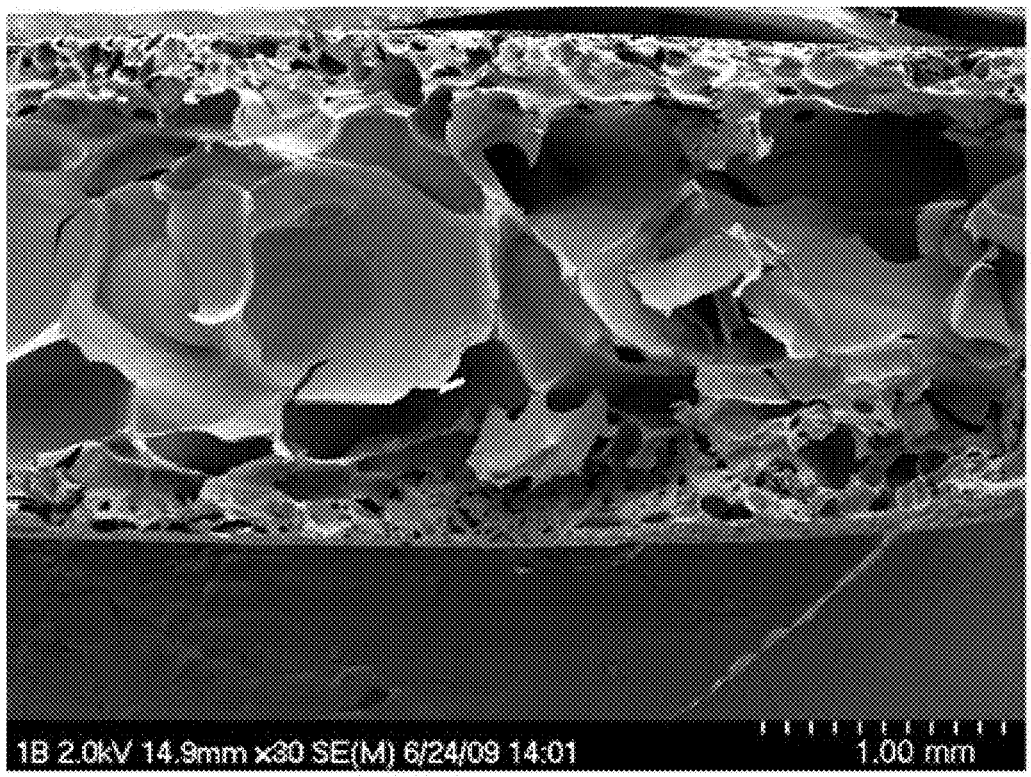
FIGS. 1A-1D (Prior Art) show SEM images of (a) starch, (b) starch-lignin, (c) starch, and (d) starch-lignin.
Figure 1B:
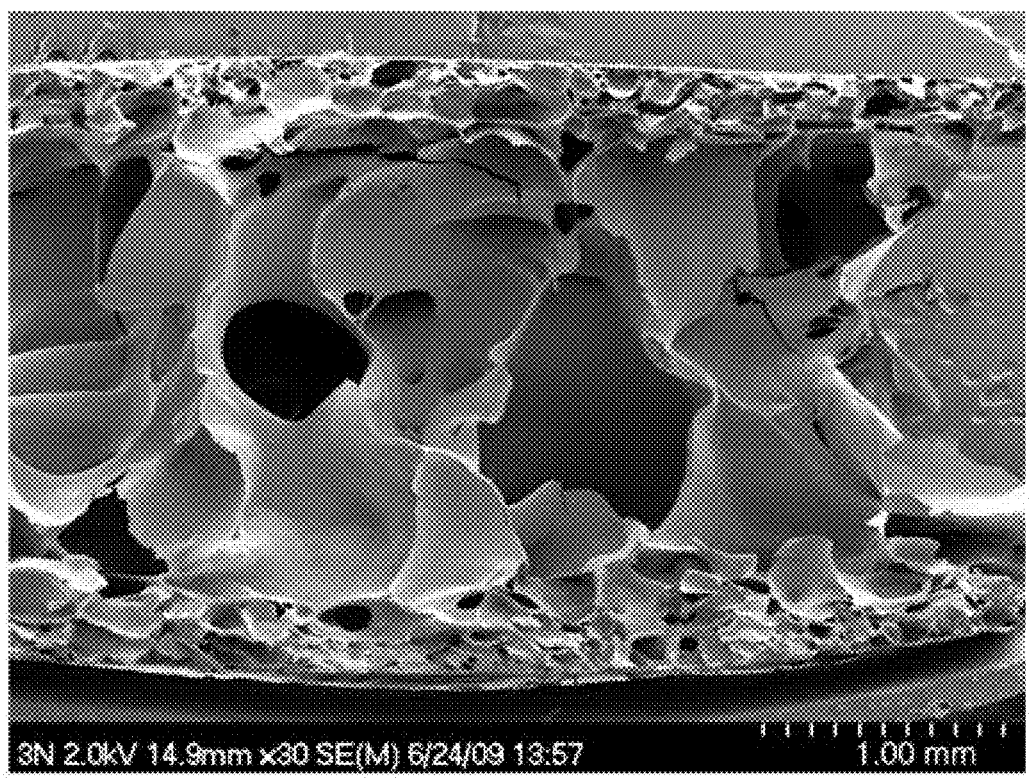
Figure 1C:
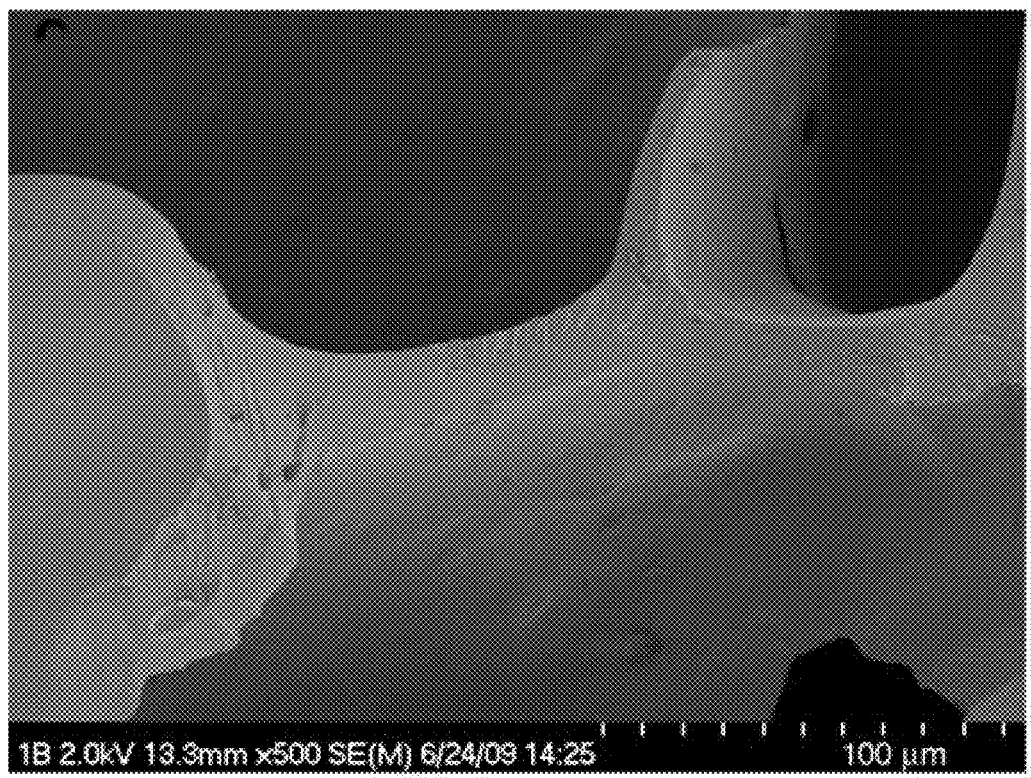
Figure 1D:
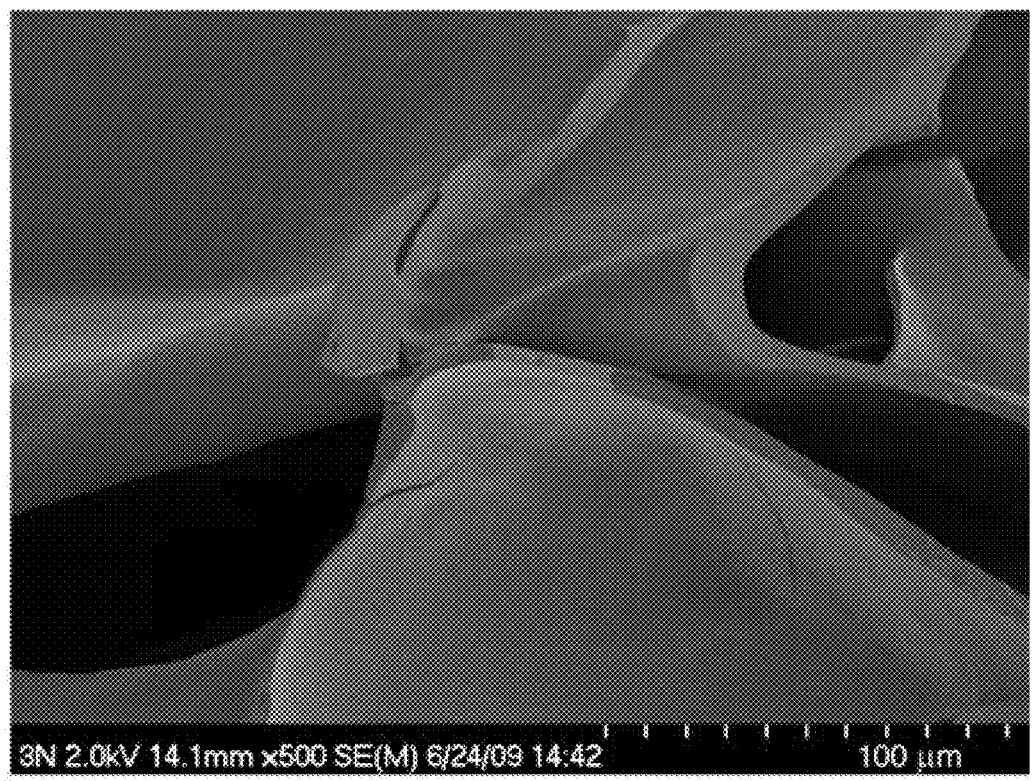
Figure 2:
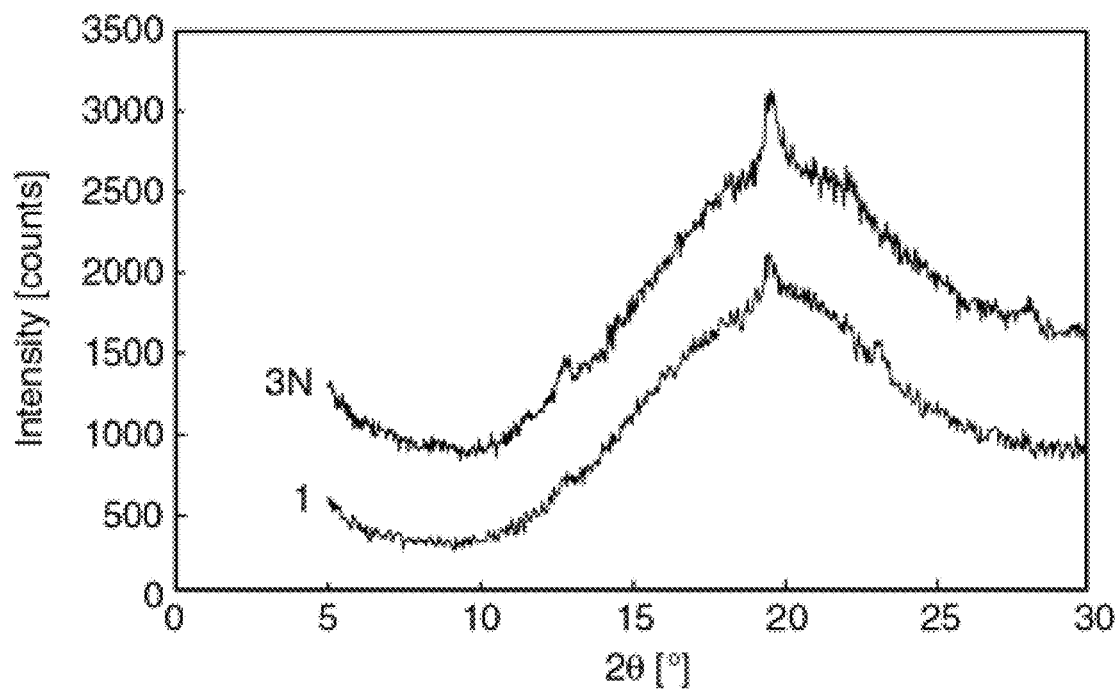
FIG. 2 (Prior Art) shows powder X-ray diffraction patterns of foams of starch and starch-lignin.
Figure 3:
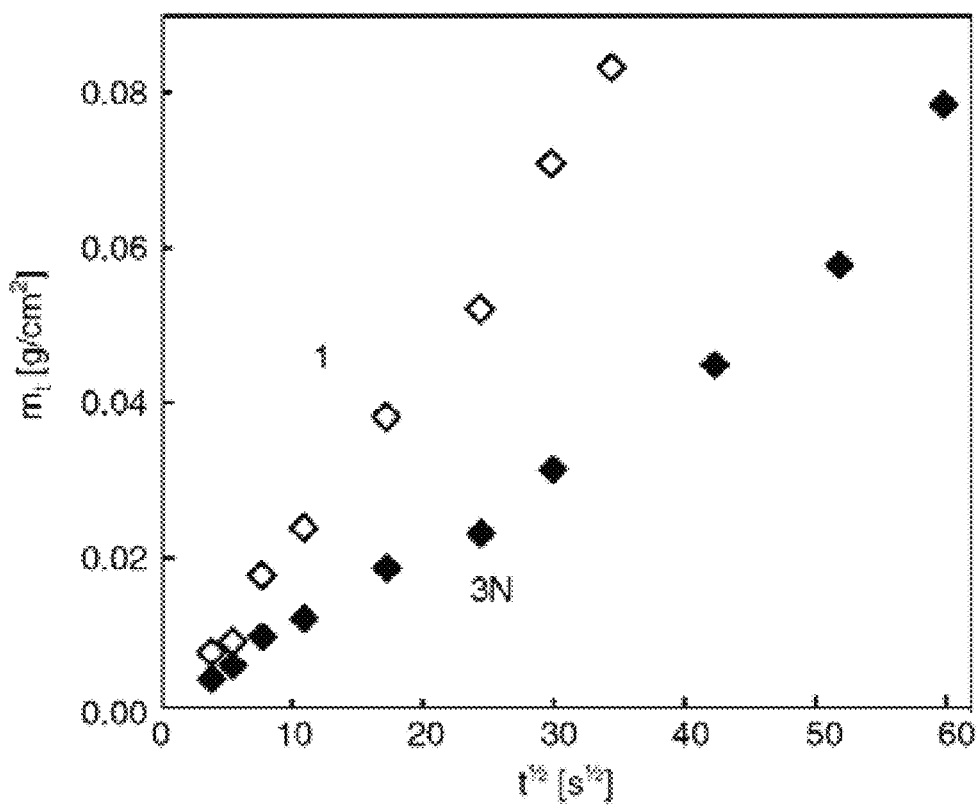
FIG. 3 (Prior Art) shows water absorption in compression molded starch and starch-lignin.

Hylon® VII cornstarch (approximately 70% amylose) was purchased from National Starch and Chemical Company, Bridgewater, N.J.

Indulin AT lignin (kraft pine lignin) was donated by MeadWestvaco, Charleston, S.C.

Norwegian talc was purchased from Zeneca Bioproducts.

Cellulose fibers were obtained from Sigma Aldrich Cat. No. C6288.

Ammonium hydroxide was purchased from Sigma-Aldrich, St. Louis, Mo.

Lignin is soluble in aqueous solution only at high pH. In studies of starch-lignin cast films (Stevens et al., 2007), ammonium hydroxide was used to raise the pH of the casting solution and was found to be a requirement for obtaining viable films. Preparing starch-lignin by extrusion, on the other hand, had no significant high-pH requirement. In the present study, samples were prepared both with and without ammonium hydroxide. When used, ammonium hydroxide was added as a 30% aqueous solution in an amount equal to the estimated stoichiometric amount of hydroxyl (—OH) protons in pine kraft lignin, 2.0 mL per 10 g lignin (McCarthy and Islam, 2000). The ammonium hydroxide is taken up by the starch-lignin mixture quickly, so that after extrusion there is no ammonia odor. Talc was added at 0.5% (w/w) as a nucleating agent.

Sample compositions are shown in Table 1. Compositions are based on total dry weight of starch, lignin, and cellulose. Samples were prepared for extrusion in 1.5 kg batches. The dry ingredients were mixed manually. Water and, when used, ammonium hydroxide solution were added and the mixture again mixed manually.

TABLE 1

Sample Compositions

| Sample | Starch (%) | Lignin (%) | Cellulose (%) | NH$_4$OH (mL) |
|---|---|---|---|---|
| 1 | 100.0 | 0.0 | 0.0 | 0 |
| 2 | 100.0 | 0.0 | 0.0 | 3.0 |
| 3 | 100.0 | 0.0 | 0.0 | 30.0 |
| 4 | 95.0 | 0.0 | 5.0 | 0 |
| 5 | 95.0 | 0.0 | 5.0 | 3.0 |
| 6 | 90.0 | 0.0 | 10.0 | 0 |
| 7 | 90.0 | 0.0 | 10.0 | 30.0 |
| 8 | 99.0 | 1.0 | 0.0 | 0 |
| 9 | 99.0 | 1.0 | 0.0 | 3.0 |
| 10 | 94.0 | 1.0 | 5.0 | 0 |
| 11 | 94.0 | 1.0 | 5.0 | 3.0 |
| 12 | 95.0 | 5.0 | 0.0 | 0 |
| 13 | 95.0 | 5.0 | 0.0 | 15.0 |
| 14 | 90.0 | 5.0 | 5.0 | 0 |
| 15 | 90.0 | 5.0 | 5.0 | 15.0 |
| 16 | 90.0 | 10.0 | 0.0 | 0 |
| 17 | 90.0 | 10.0 | 0.0 | 30.0 |
| 18 | 81.0 | 9.0 | 10.0 | 0 |
| 19 | 80.0 | 20.0 | 0.0 | 0 |
| 20 | 80.0 | 20.0 | 0.0 | 60.0 |
| 21 | 72.0 | 18.0 | 10.0 | 0 |

Example 1

Several samples of unmodified high amylose cornstarch containing varying amounts of lignin (Table 1) were extruded. Mixed powders were fed using a loss-in-weight feeder into a ZSK 30 Werner and Pfleiderer twin-screw extruder comprised of 14 barrel sections (including the feed throat) and with temperature control zones. Total feed rates were approximately 120 g/min and varied slightly with formulation. The screw speed was 150 rpm. Starch and lignin powders were mixed with 0.5% talc (w/w) as a nucleating agent and, in some examples, cellulose fibers, and fed using a loss-in-weight feeder into barrel Section 1. Three dispersive mixing sections were located in barrel Sections 5, 6, and 7, followed by a series of four distributive mixing sections separated by conveying elements. These four sections were each comprised of two forwarding kneading blocks, a neutral (non-forwarding) kneading block, and a reverse kneading block. The final barrel section was comprised of conveying elements of narrow pitch. A temperature profile of 40/65/95/120/130/130/95/95° C. was used. Water was added to maintain a total moisture content of approximately 17%. Extrudates were cut at the die face with an attached motorized chopper operating at 600 rpm.

The expanded products were collected and evaluated. Results are shown in Table 2. At 20% lignin there is no significant change in unit density, but there are significant decreases in resiliency and compressive strength, indicating brittleness.

TABLE 2

| Sample Material | Unit Density (kg/m³) | Resiliency (%) | Compressive strength (MPa) |
|---|---|---|---|
| Hylon VII | 33.8 ± 3.0 | 66 ± 4 | 0.18 ± 0.02 |
| Hylon VII, 1% lignin | 32.5 ± 1.3 | 66 ± 4 | 0.14 ± 0.02 |
| Hylon VII, 5% lignin | 31.5 ± 0.9 | 72 ± 4 | 0.16 ± 0.01 |
| Hylon VII, 10% lignin | 38.9 ± 3.7 | 63 ± 4 | 0.18 ± 0.02 |
| Hylon VII, 20% lignin | 31.0 ± 0.9 | 38 ± 13 | 0.10 ± 0.01 |

Example 2

Additional samples of high amylose starch and lignin were prepared with added cellulose fibers to prepare expanded foam products using the same procedure as Example 1. Results are shown in Table 3.

TABLE 3

| Sample Material | Unit Density (kg/m³) | Resiliency (%) | Compressive strength (MPa) |
|---|---|---|---|
| Hylon VII | 33.8 ± 3.0 | 66 ± 4 | 0.18 ± 0.02 |
| Hylon VII, 5% cellulose | 39.0 ± 1.7 | 68 ± 3 | 0.19 ± 0.01 |
| Hylon VII, 10% cellulose | 55.1 ± 3.9 | 69 ± 5 | 0.24 ± 0.02 |
| Hylon VII, 1% lignin, 5% cellulose | 35.8 ± 1.5 | 61 ± 4 | 0.18 ± 0.02 |
| Hylon VII, 5% lignin, 5% cellulose | 36.9 ± 1.5 | 67 ± 3 | 0.16 ± 0.01 |
| Hylon VII, 9% lignin, 10% cellulose | 54.7 ± 4.7 | 63 ± 4 | 0.26 ± 0.02 |
| Hylon VII, 18% lignin, 10% cellulose | 61.3 ± 3.5 | 56 ± 5 | 0.32 ± 0.05 |

10% cellulose fibers restores the compressive strength at high lignin content, but with a significant increase in density. 5% cellulose fibers have little effect.

Samples of Hylon VII starch containing 9-20% lignin remained intact after immersion in water for 24 h. Hylon VII, and samples containing 5% lignin or less, disintegrated in water after 30 s. Parameters describing water absorption are shown in Table 4.

TABLE 4

| Sample Material | Water absorbed in 24 h (g/g) | Water absorbed in 24 h (g/cm²) |
|---|---|---|
| Hylon VII | Sample disintegrates | Sample disintegrates |
| Hylon VII, 5% lignin | Sample disintegrates | Sample disintegrates |
| Hylon VII, 10% lignin | 3.65 | 0.041 |
| Hylon VII, 9% lignin, 10% cellulose | 3.13 | 0.044 |
| Hylon VII, 18% lignin, 10% cellullose | 2.62 | 0.039 |

The data indicate that extruded foams prepared with unmodified high amylose starch to which lignin has been added at a level of 9-18% have significant water resistance. After 24 h immersed in water they remain intact, in contrast to extruded 100% unmodified starch foams and foams containing 5% lignin and 95% unmodified starch, which disintegrate in less than a minute. Moreover, foam material containing 10% lignin, 90% unmodified starch, and no cellulose has approximately the same water resistance as foam material containing 9% lignin and 10% cellulose fibers and foam material containing 18% lignin and 10% cellulose fibers. Neither increasing the lignin content to 18% nor adding 10% cellulose fibers significantly increases water resistance beyond the resistance of foam material containing 10% lignin and no cellulose fibers.

Table 5 shows previously reported results on disintegration time in water together with results for the present invention. The present invention provides water resistance to starch-based foams.

TABLE 5

| Composition | Disintegration time following immersion in water | References |
|---|---|---|
| Hylon VII (high-amylose starch) | <0.2 min | |
| Hylon VII ether + styrene acrylate resins | 1-35 min | U.S. Pat. No. 5,043,196 |
| Hylon VII ether + flour proprionate | 0.2-17 min | U.S. Pat. No. 5,554,660 |
| Eco-Foam ™ (National Starch) | ~1 min | U.S. Pat. No. 5,854,345 |
| Clean Green ™ (Clean Green) | ~2 min 20 sec | U.S. Pat. No. 5,854,345 |
| Enpak ™ (DuPont) | ~2 min | U.S. Pat. No. 5,854,345 |
| Starch + polyester | >30 min | U.S. Pat. No. 5,854,345 |
| Hylon VII, 10% lignin | >24 hr | present invention |
| Hylon VII, 9% lignin, 10% cellulose | >24 hr | present invention |
| Hylon VII, 18% lignin, 10% cellulose | >24 hr | present invention |

<sup>a</sup> PO, propylene oxide
<sup>b</sup> 3.9% styrene acrylate resin A, B, or C
<sup>c</sup> PVA, polyvinyl alcohol Example 3 (Comparative)

This example illustrates examining the effect of adding ammonium hydroxide to the extrusion formulations in this invention. Lignin is soluble in aqueous solution only at high pH and ammonium hydroxide is required when casting starch-lignin films in order to increase the compatibility of starch and lignin. Ammonium hydroxide was added as a 30% aqueous solution in an amount equal to 2.0 mL per 10 g lignin. The ammonium hydroxide is taken up by the starch-lignin mixture quickly so that after extrusion there is no ammonia odor. As seen in the results of Table 6, compared with Tables 2 and 3, the addition of ammonium hydroxide has no significant effect on the properties of the extruded foams.

TABLE 6

| Sample Material | Unit Density (kg/m³) | Resiliency (%) | Compressive strength (MPa) |
|---|---|---|---|
| Hylon VII, 1% lignin, NH₄OH | 33.8 ± 1.2 | 66 ± 3 | 0.15 ± 0.01 |
| Hylon VII, 1% lignin, 5% cellulose, NH₄OH | 36.4 ± 2.0 | 70 ± 5 | 0.20 ± 0.02 |
| Hylon VII, 5% lignin, NH₄OH | 32.2 ± 1.3 | 66 ± 3 | 0.16 ± 0.02 |
| Hylon VII, 5% lignin, 5% cellulose, NH₄OH | 37.1 ± 1.7 | 66 ± 3 | 0.17 ± 0.01 |
| Hylon VII, 10% lignin, NH₄OH | 33.2 ± 1.9 | 67 ± 4 | 0.16 ± 0.01 |
| Hylon VII, 20% lignin, NH₄OH | 30.6 ± 1.1 | 33 ± 6 | 0.10 ± 0.02 |

Example 4

Sample Characterization
Unit Density

Unit density is the weight-to-volume ratio of an individual specimen; it is a measure of the reduction in density of the solid material that results from the expansion process. The volume of a specimen was determined by measuring the weight of glass beads it displaced.

Unit density is the weight-to-volume ratio of an individual specimen; it is a measure of the reduction in density of the solid material that results from the expansion process. The volume of a specimen was determined by measuring the weight of glass beads it displaced (Hwang and Hayakawa, 1980; Bhatnagar and Hanna, 1995; Tatarka and Cunningham, 1998; Rutledge et al., 2008). The volume of a weighing bottle, with its top surface cut flat, was calibrated with glycerol (V=21.43±0.04 mL, SD, n=10). The effective density of the glass beads ($\rho_{gb}$), defined as the ratio of a given mass of beads to the volume they occupy, was determined by filling the weighing bottle with glass beads (0.5 mm diameter) in four steps, tapping the bottle 40 times to settle the beads after each step. The bottle was then overfilled with glass beads, the excess was removed by drawing a metal flat edge across the top, and the bottle was weighed. $\rho_{gb}$=1.559±0.003 g/mL (SD, n=10).

To determine the density of a foam specimen, the weighing bottle was one-quarter filled with glass beads and tapped 40 times to settle. A weighed foam specimen was placed on the surface of the glass beads, and the bottle was filled with glass beads in three steps. The bottle was then overfilled, the excess removed, and the bottle weighed. The density of the specimen was calculated from the mass of the displaced glass beads. Three specimens of each composition were measured, with ten measurements of each specimen.

Figure 4:
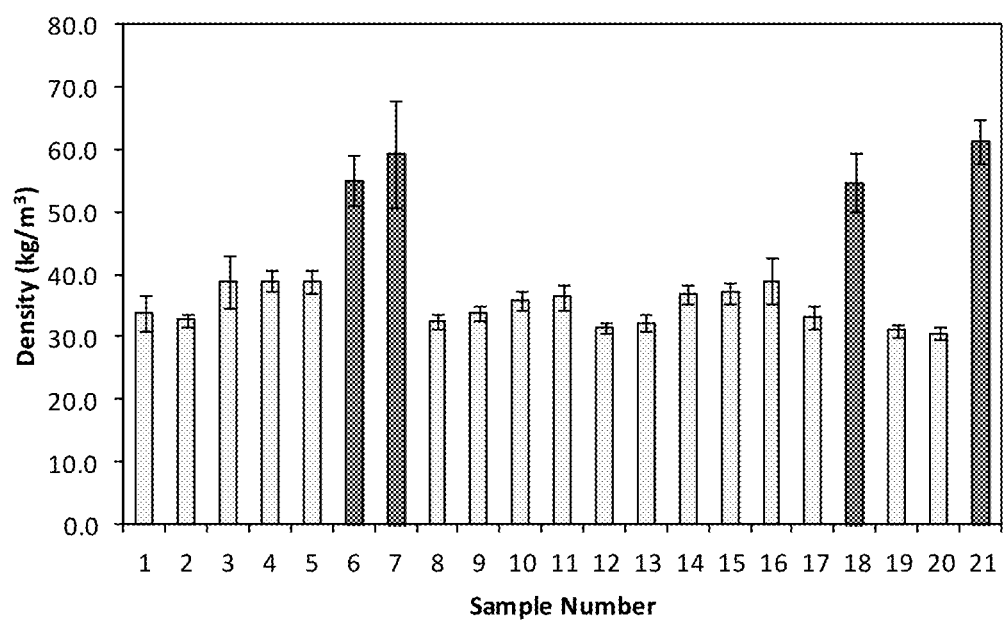
FIG. 4 shows unit densities of the samples described in Table 1.

The results of the density measurements are displayed in FIG. 4, in which the dark shaded bars are for samples containing 10% cellulose fibers.

The addition of 20% lignin (samples 19 and 20) does not increase foam density; it has no effect on foam expansion. The addition of 5% cellulose, with or without lignin, also has no effect on density (samples 4, 5, 10, 11, 14, 15).

Samples containing 10% cellulose fibers displayed increased density, whether or not lignin was present (samples 6, 7, 18, 21; shown as dark shaded bars in FIG. 1). The addition of ammonium hydroxide had no significant effect on density.

All samples in the present study had densities in the range of 30-40 kg/m$^3$ except for samples that contained 10% cellulose fibers, which had densities of 50-65 kg/m$^3$. A wide range of extruded starch-based foams have been studied in the laboratory. Their densities, depending on formulation and processing, have been in the ranges of 21-40 kg/m$^3$ (U.S. Pat. No. 5,801,207), 22-30 kg/m$^3$ (Nabar et al., 2006), 18-30 kg/m$^3$ (U.S. Pat. No. 5,854,345), and 30-60 kg/m$^3$ (Bhatnagar and Hanna, 1995). Except for the samples with 10% cellulose fibers, the densities of the compositions studied here are in the same range of density as extruded foams previously studied in the laboratory. The densities of the extruded starch and starch-lignin foams described here are significantly less than those of starch and starch-lignin foams prepared by compression molding (Stevens et al., 2010).

Densities of various commercial starch fills are lower; they have been measured as 23.2 kg/m$^3$ (Bhatnagar and Hanna, 1995) and 17-23 kg/m$^3$ (Tatarka and Cunningham, 1998). Densities of commercial foamed polystyrene samples have been reported to be as low as 8.9 kg/m$^3$ (Bhatnagar and Hanna, 1995), 7.2 kg/m$^3$ (Tatarka and Cunningham, 1998), 7.9 kg/m$^3$ (Tatarka and Cunningham, 1998), and 20.3 kg/m$^3$ (Tatarka and Cunningham, 1998).

Morphology

For scanning electron microscope (SEM) measurements, specimens were fractured in liquid nitrogen, dried, sputter-coated with Au—Pd, and examined with a Hitachi S-4700 scanning electron microscope.

Effect of Lignin on Cell Size

In FIG. 5, low resolution (×25) cross-section SEM images are shown of starch samples containing increasing amounts of lignin (0-20%), but no cellulose fibers. Lignin appears to have no appreciable effect on cell size; cell sizes for all samples are in the range of 0.6-1.0 mm. Lack of contrast makes the location of the dispersed lignin impossible. Nevertheless, the SEM images show that 20% lignin can be incorporated into starch foams without collapse of the foam and with no major reduction in cell size. Stevens et al. (2010) previously found the same result with starch-lignin foams prepared by a compression molding method.

A significant difference between the morphology of the extruded starch-lignin foams and starch-lignin foams prepared by a compression molding process (Stevens et al., 2010; Tiefenbacher, 1993; Shogren et al., 1998) is the absence, in the present extruded foams, of any significant surface "skin". The extruded foams (FIGS. 5A-5E) have a very thin continuous or semi-perforated skin, approximately the thickness of the interior cell walls (see below). The thick skin in compression molded foams may be due to the rapid drying of a starch layer on the hot metal surface, so that it cannot expand. In contrast, there may be enough steam present outside the expanding starch extrudate that it remains viscoelastic and can expand, thus thinning the exterior wall.

The similarity of the SEM images shown in FIGS. 5A-5E is consistent with the similarity in the densities of those samples (FIG. 4); 20% of the starch can be replaced with lignin without affecting the overall cell size or density of extruded foams.

Effect of Cellulose Fibers on Cell Structure

Figure 5A:
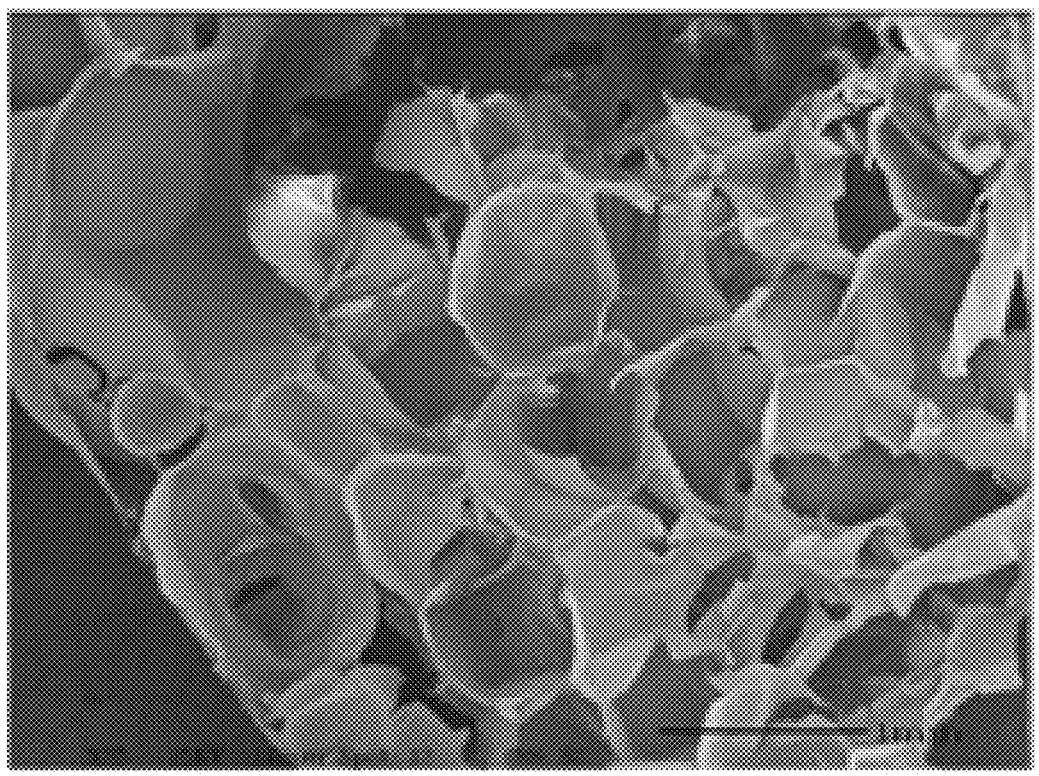
FIGS. 5A-5E show low resolution (×25) cross-section SEM images of samples with increasing lignin content: (A) 0% (sample 1), (B) 1% (sample 8), (C) 5% (sample 12), (D) 10% (sample 16), (E) 20% (sample 19).
Figure 5B:
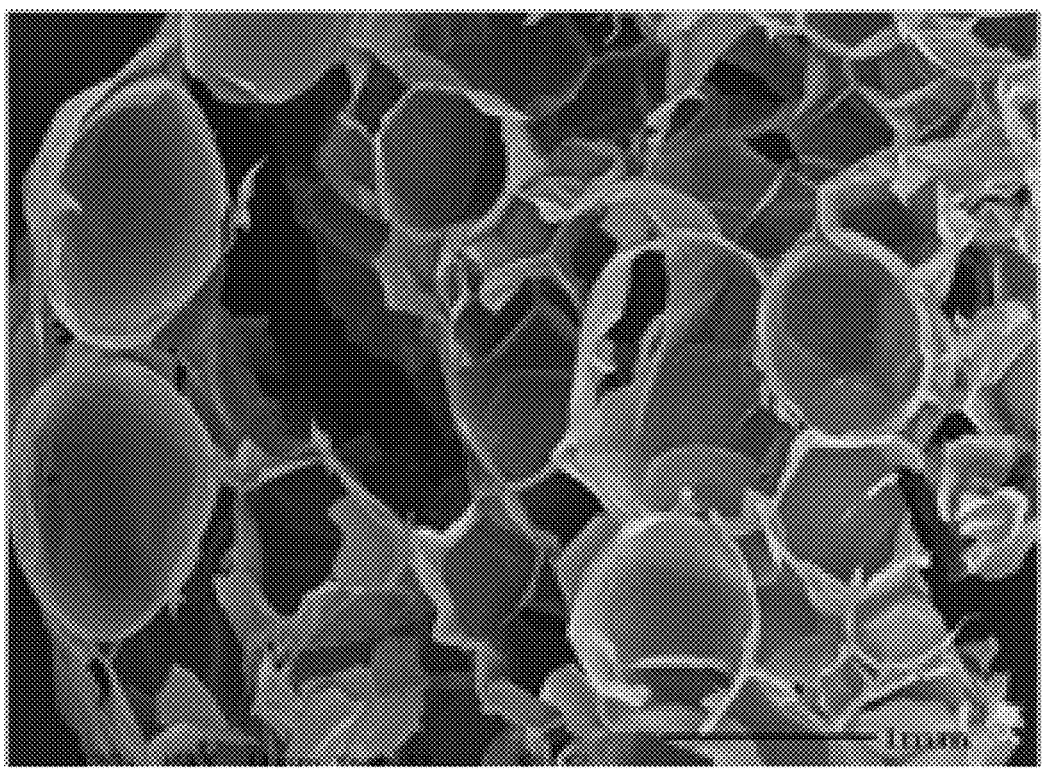
Figure 5C:
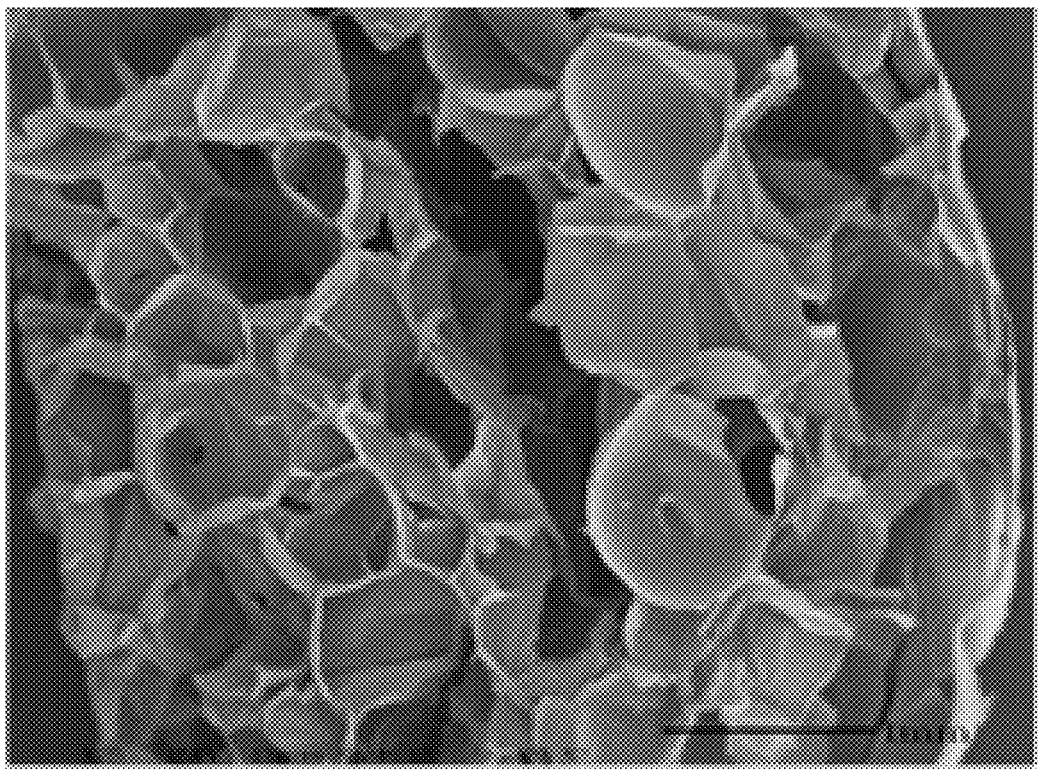
Figure 5D:
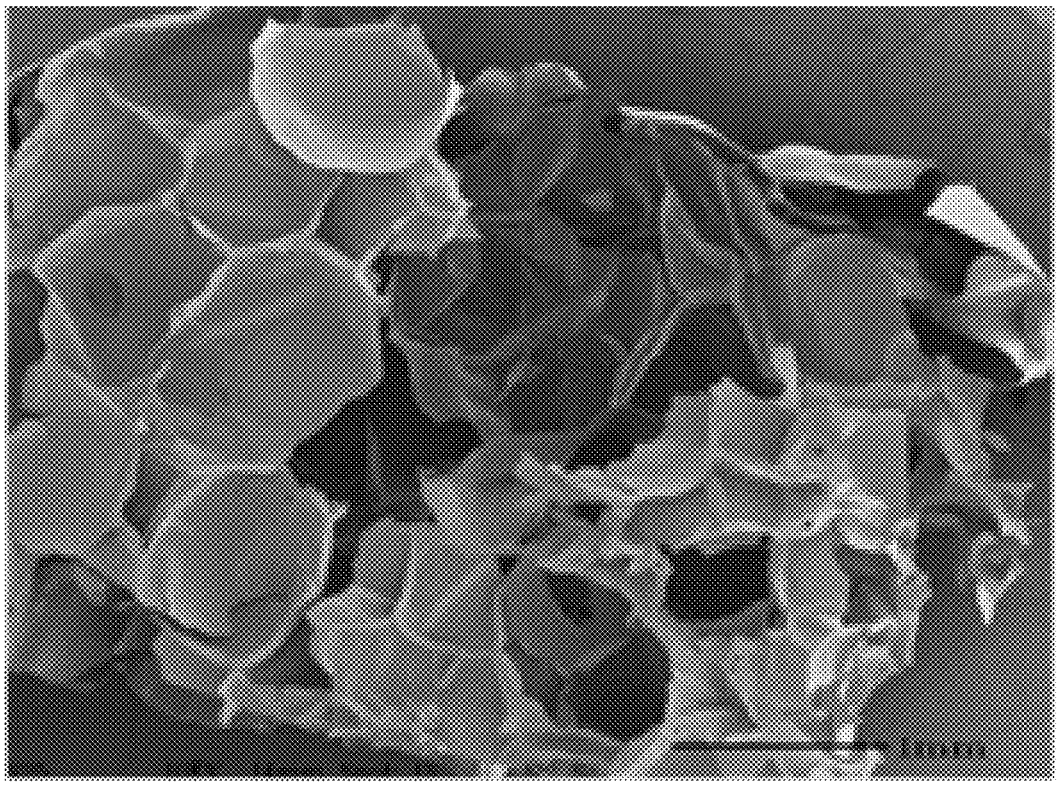
Figure 5E:
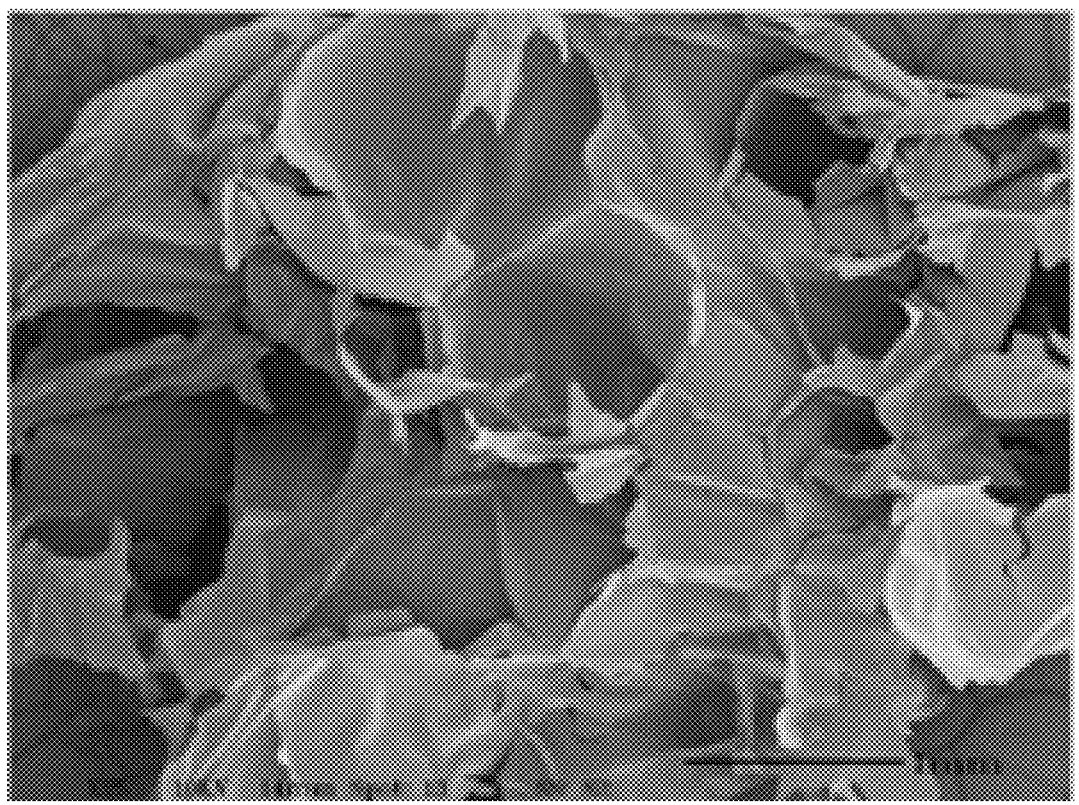
Figure 6A:
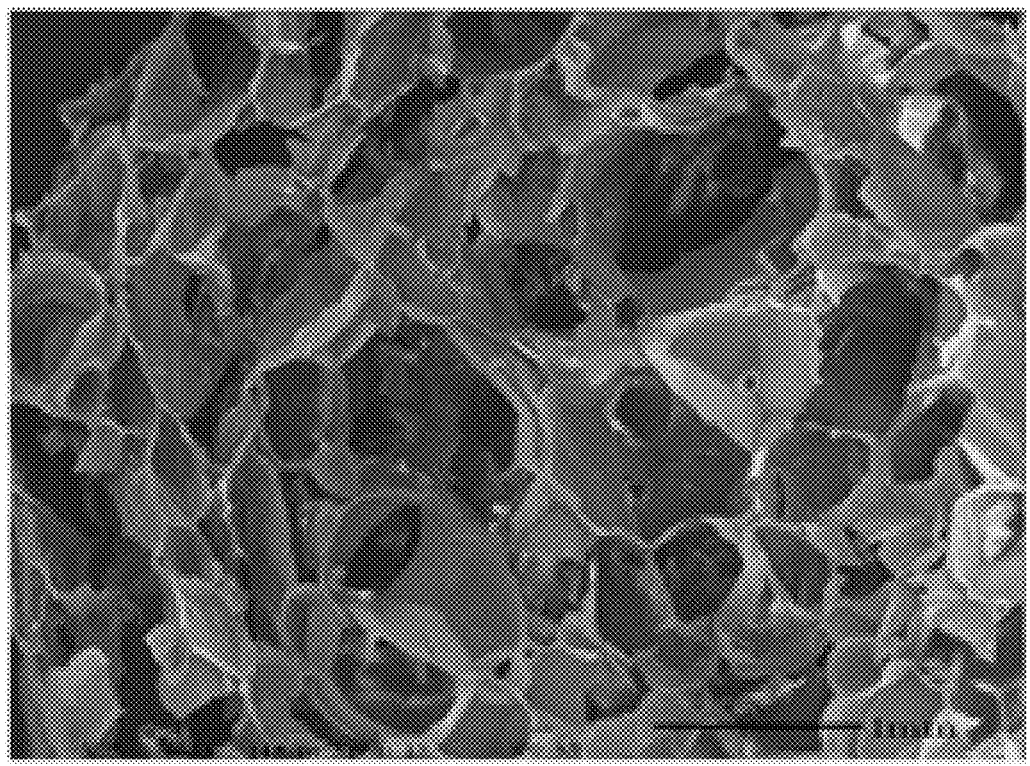
FIGS. 6A-6F show cross-section SEM images (×25) showing the effect on cell structure of adding cellulose fibers (5% cellulose, left; 10% cellulose right): (A) sample 4, (B) sample 6, (C) sample 10, (D) sample 18, (E) sample 14, (F) sample 21.
Figure 6B:
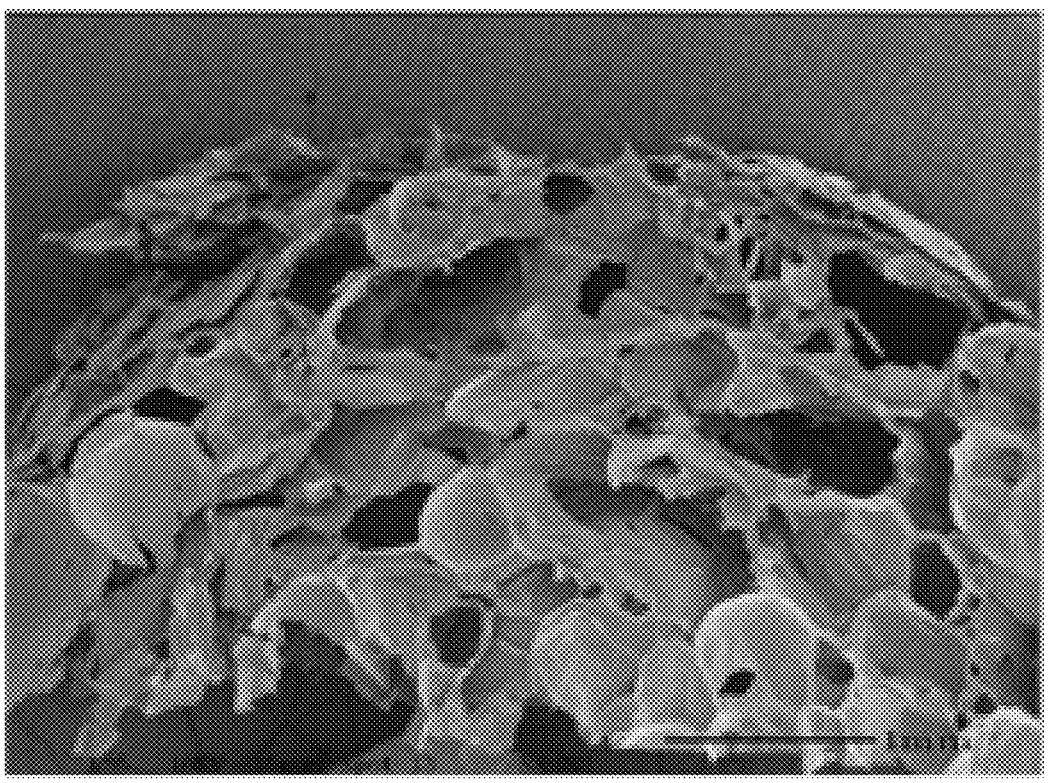
Figure 6C:
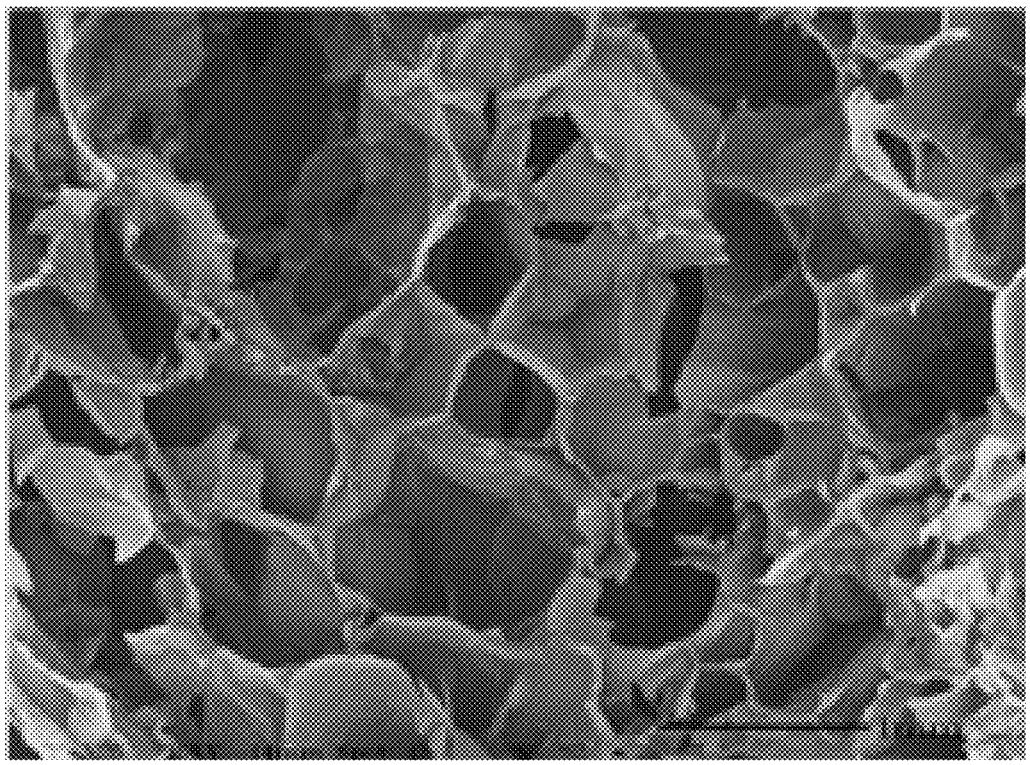
Figure 6D:
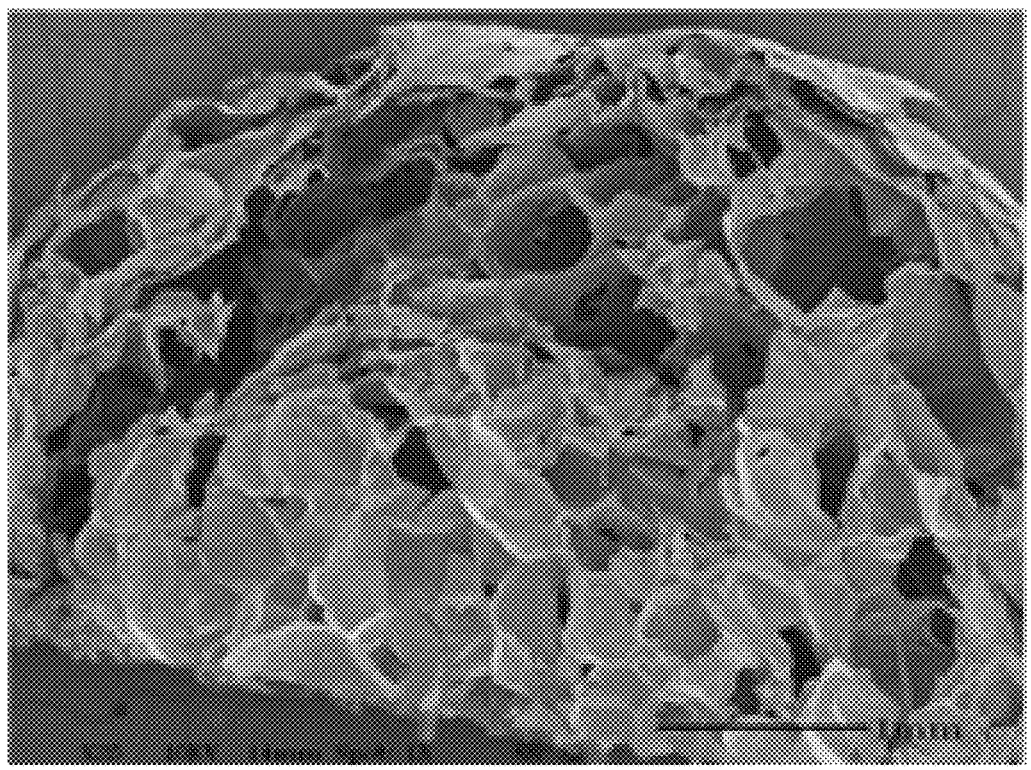
Figure 6E:
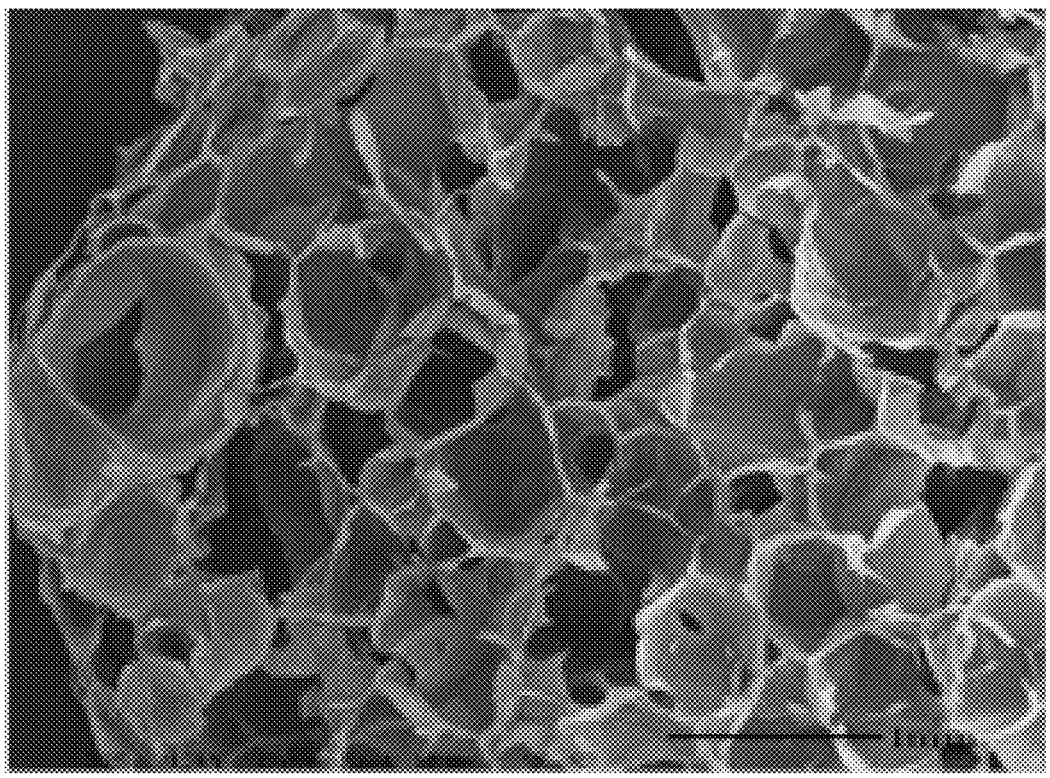
Figure 6F:
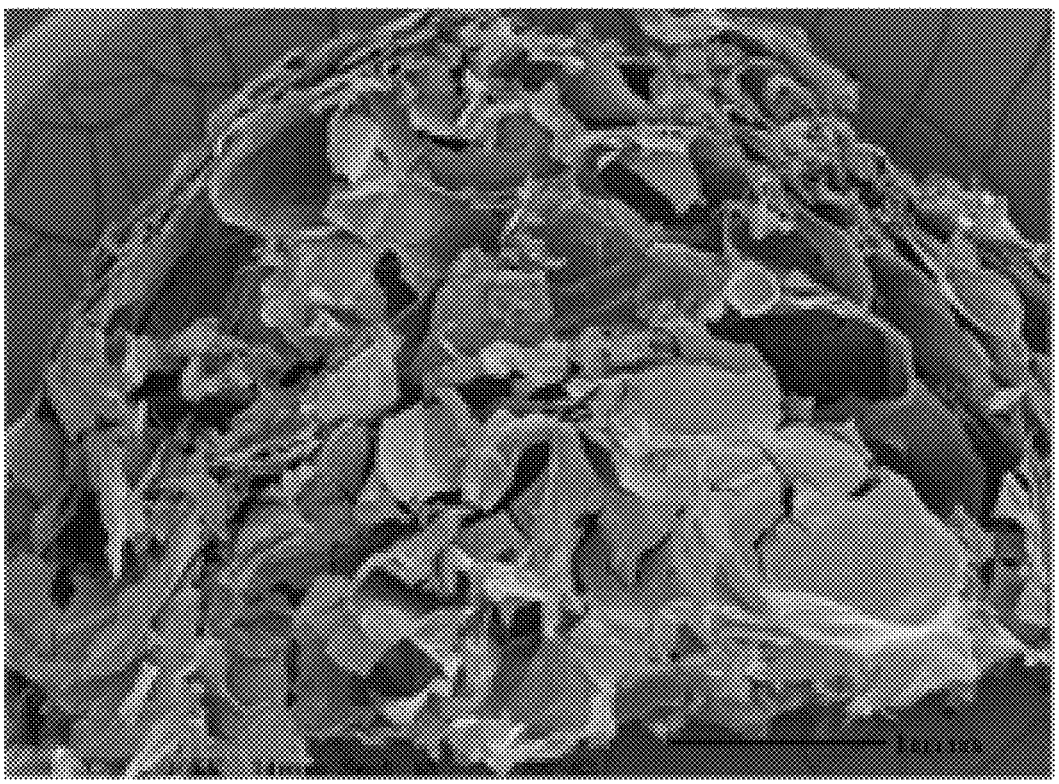
Figure 7A:
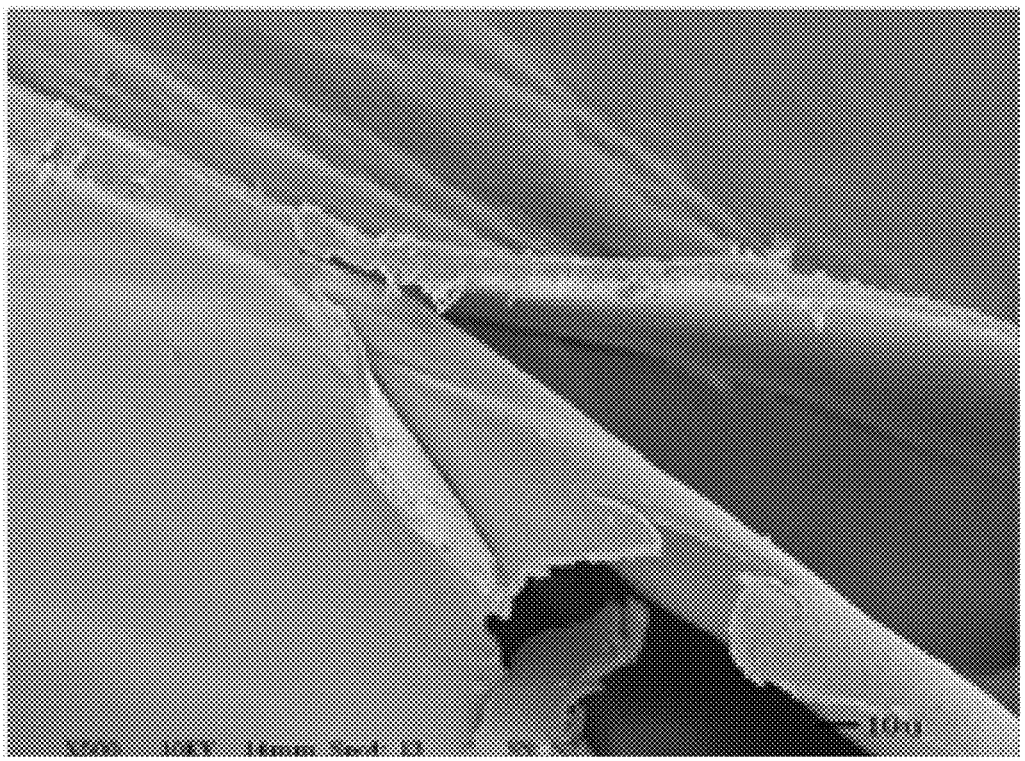
FIGS. 7A-7D show cross-section SEM images (×500) showing the effect of cellulose fibers on cell wall thickness (left 0% cellulose; right 10% cellulose). (A) sample 1, (B) sample 7, (C) sample 16, (D) sample 18.
Figure 7B:
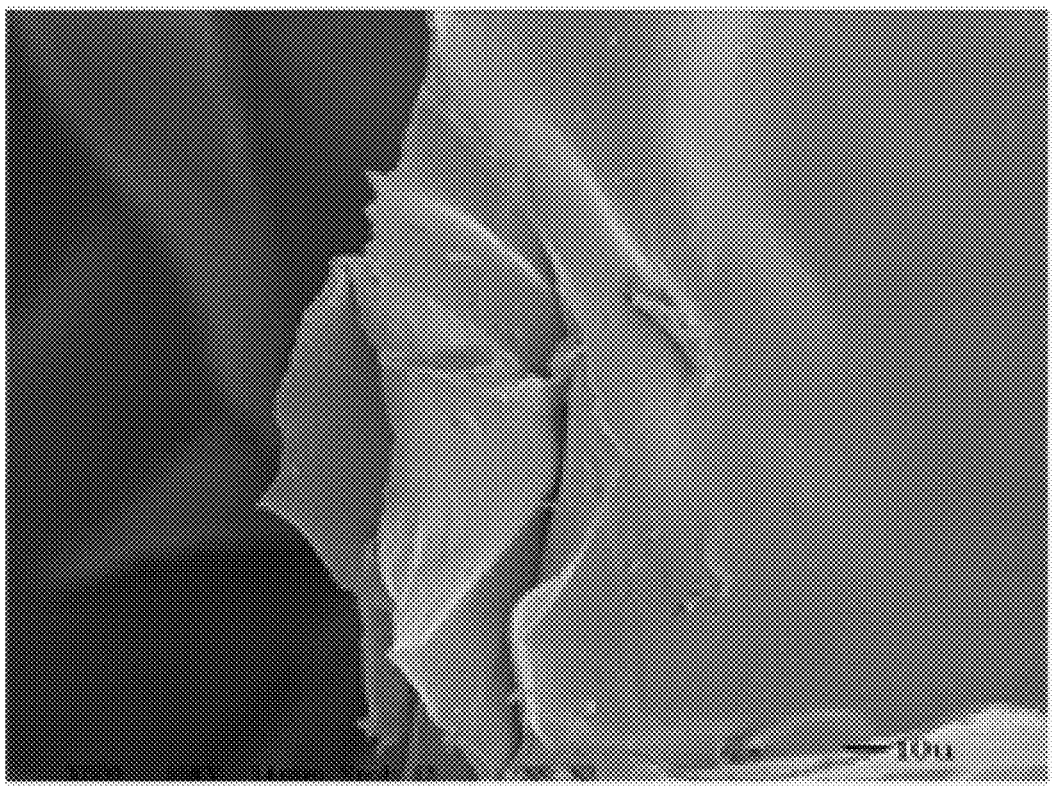
Figure 7C:
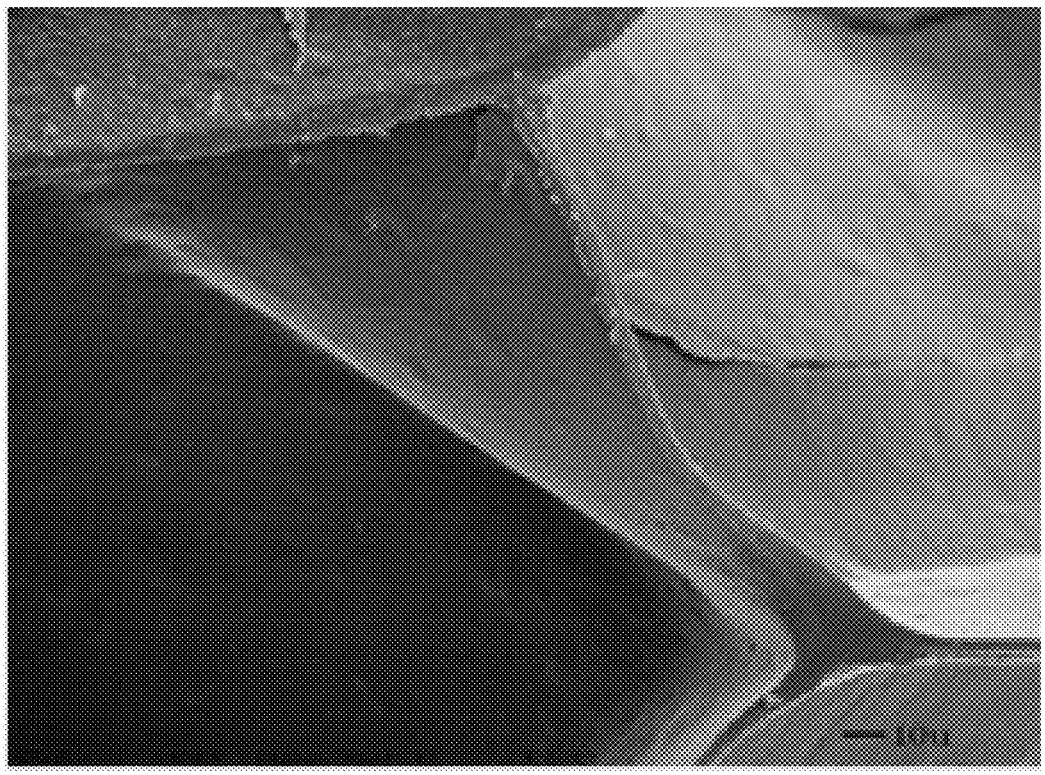
Figure 7D:
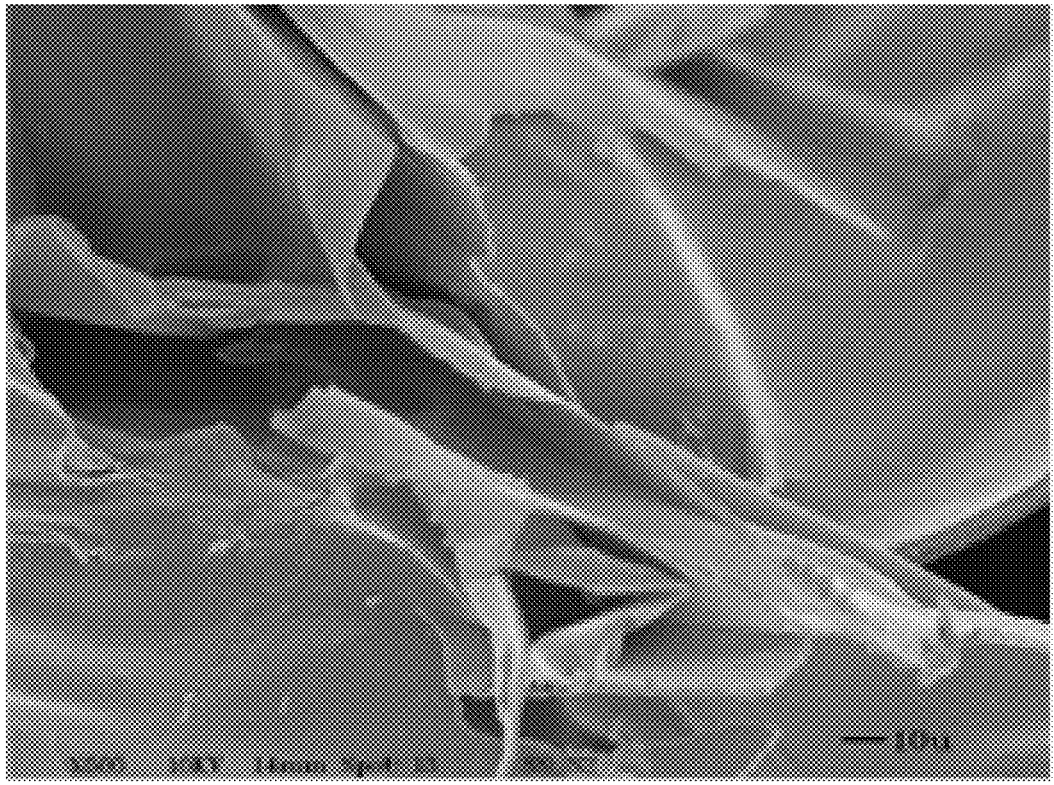

FIG. 6A-6E shows low-resolution (×25) cross-section SEM images that display the effect of adding cellulose fibers. The left images (A, C, E) are those of foams containing only 5% cellulose fibers. The cell sizes are approximately the same as those of foams containing no cellulose fibers (FIG. 5A). The absence of any effect of 5% cellulose fibers on cell structure, as displayed in the SEM images, is reflected in the absence of any effect on density (FIG. 4).

The right images in FIG. 5(B, D, F) are those of foams containing 10% cellulose fibers. There is a significant disruption of the cell structure, although the remaining cells are of approximately the same size as those in foams with no cellulose and those with 5% cellulose. The partial cell collapse resulting from adding 10% cellulose fibers is independent of the amount of lignin; the foams shown in FIG. 6(B, D, F) contain 0%, 9%, and 18% lignin, respectively.

The effect of adding 10% cellulose fibers, as shown in the SEM images, is clearly reflected in the increase in unit densities of those foams (FIG. 4). It may be that the open cells created during expansion in the presence of 10% cellulose fibers prevent the foam from continuing the expansion.

Therefore, there is a limit in the amount of cellulose fibers that can be added before introducing a deleterious effect on density.

Effect of Cellulose Fibers on Internal Cell Walls

FIGS. 7A-7D show cross-section SEM images (×500) indicating that the addition of 10% cellulose fibers results in thinner cell walls, regardless of the amount of lignin. Images on the left are of samples containing 0% (A) and 10% (C) lignin but no cellulose; the cell wall thickness is in the range of 5±2 μm. Images on the right are of samples containing 0% (B) and 9% (D) lignin and 10% cellulose; the cell wall thickness is approximately 1.5 μm. Therefore, the addition of cellulose fibers at 10% increases the density, partially collapses the cell structure, and results in thinner cell walls. In contrast, the walls of the internal cells in starch-lignin compression molded foams are approximately 10 μm thick (Stevens et al., 2010).

Mechanical Properties

Compressive Strength and Resiliency

Compressive strength and resiliency were measured with an Instron Model 4500 testing instrument. For resiliency measurements the sample was compressed 3 mm, the probe was lifted for 1 min, followed by recompressing until the probe touched the sample and measuring the distance (d) at which the load started to increase. The percent resiliency was calculated as $$R(\%) = \frac{3.0 - d}{3.0} \times 100$$

Figure 8:
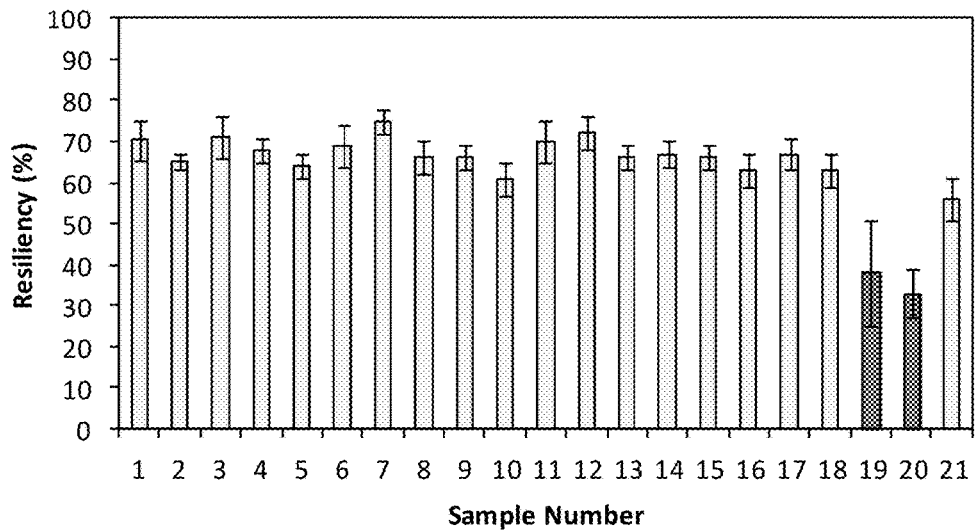
FIG. 8 shows resiliencies of the samples described in Table 1. The dark shaded bars are for samples containing 20% lignin.

The results of resiliency measurements are shown in FIG. 8. At lignin contents of 10% or less (samples 1-18), lignin causes no reduction in resiliency. At 20% lignin content (samples 19 and 20) there is a significant decrease in resiliency, which can be restored with the addition of 10% cellulose fibers (sample 21) but with an accompanying increase in density (see above).

Figure 9:
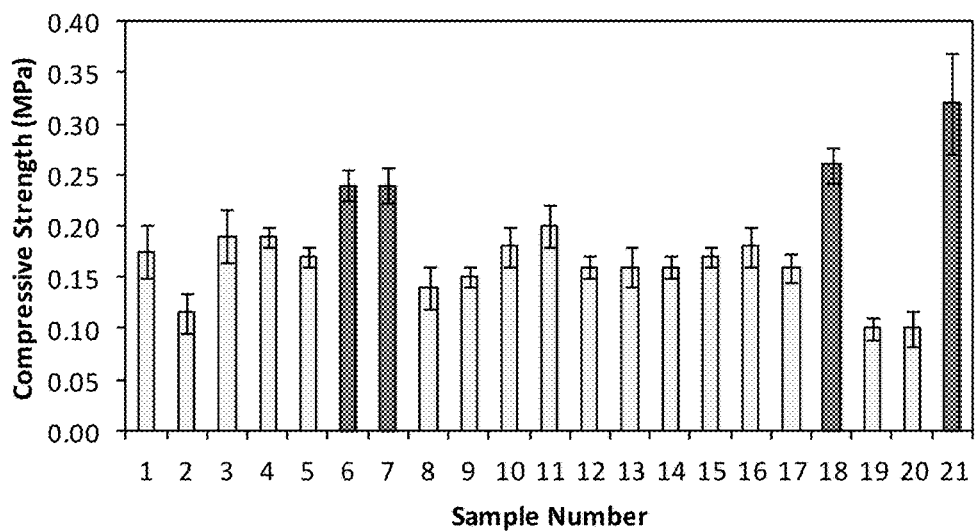
FIG. 9 shows compressive strengths of the samples described in Table 1. The dark shaded bars are those of samples containing 10% cellulose fibers.

Compressive strengths are displayed in FIG. 9. The results are strongly correlated with sample density (FIG. 4). The addition of 10% cellulose fibers increases compressive strength (dark shaded samples) whether or not lignin is present. As with resiliency (FIG. 8), there is a significant decrease in compressive strength at 20% lignin content (samples 19 and 20) which can be restored with the addition of 10% cellulose fibers (sample 21), but with an accompanying increase in density.

Figure 10:
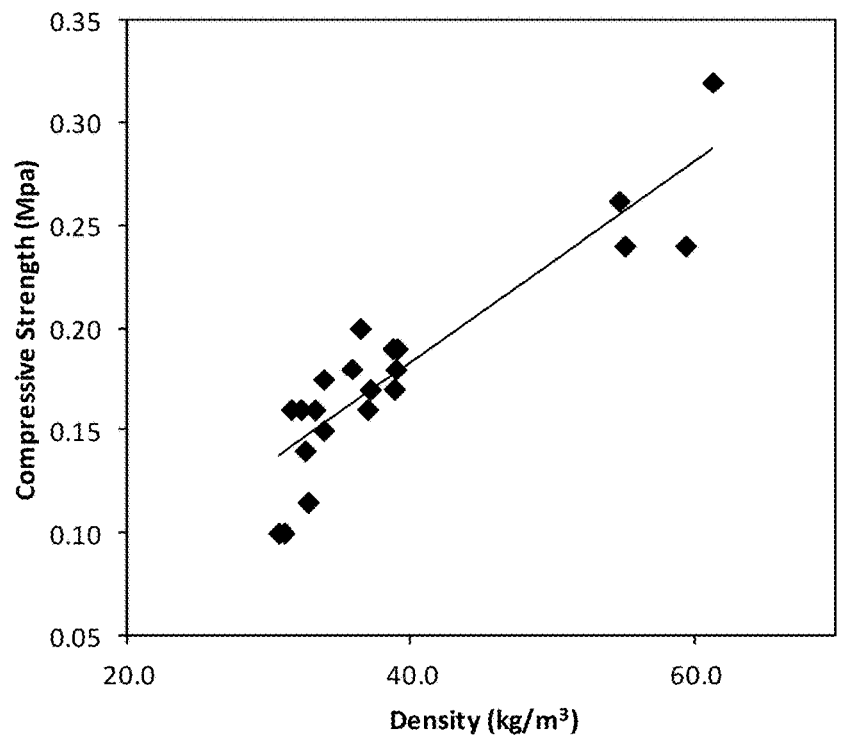
FIG. 10 shows compressive strength as a function of density.

The dependence of mechanical properties on foam density can be described in terms of a power law function (Gibson and Ashby, 1997; Liu et al., 1999, 2003; Christensen, 2000; Roberts and Garboczi, 2001, 2002a, 2002b; Zimmerman and Bodvarsson, 1989). FIG. 10 shows the compressive strength as a function of density. When the data are fit to a power law function the results shown in Equation 1 are obtained.

Compressive Strength(MPa)=(0.0036±0.0015)Density(kg/m$^3$)$^{(1.07±0.015)}$ (1)

Willett and Shogren (2002) similarly found an exponent of 0.92±0.12 in their study of starch foams. The simple linearity between compressive strength and density may be the result of the large volume fraction of voids in the present foam samples; i.e., the density of the foams (p) is small compared to the density of the cell walls. If the density of the cell walls is taken to be the density of unfoamed starch ($\rho_s$), 1500 kg/m$^3$ (Liu et al., 1999), the volume fraction of solid material in the present samples, $\phi = \rho/\rho_s$, is quite small and in the range 0.020-0.040.

Water Absorption

Water absorption was first evaluated by immersing a specimen in 100 mL of water and measuring the time it took for the specimen to disintegrate completely. Selected samples which did not disintegrate within 10 minutes were further examined. Water absorption of those samples was measured using an immersion gravimetric method. Specimens were conditioned for 24 h at 50° C., weighed, then immersed in a 23° C. water bath for 22 specified times ranging from 1 s to 24 h. To keep the specimens submerged and maximally exposed to water, the specimens were penetrated with a thin wire attached to a support, which was then immersed in the water and held in place with a clamp. Upon removal from the water bath, excess water was removed with absorbent paper and the specimens were reweighed. Three specimens were measured at each immersion time, for each sample. The weight of absorbed water per unit surface area was calculated using the mass of the specimen, the volume of the specimen determined from its density, and an equivalent sphere model.

Samples containing 9-20% lignin (samples 16-21, Table 1) remained intact, even after being immersed in water for 24 h. Specimens containing no lignin, however, and samples containing up to 5% lignin (samples 1-15) disintegrated within 30 s when immersed in water.

The water absorption of samples 16, 18 and 21 was measured using an immersion gravimetric method (Stevens et al., 2010; ASTM, 2007a; Abacha et al., 2009; Berketis and Tzetzis, 2009). Specimens were conditioned for 24 h at 50° C., weighed, then immersed in a 23° C. water bath for 22 specified times ranging from 1 s to 24 h. To keep the specimens submerged and maximally exposed to water, the specimens were penetrated with a thin wire attached to a support, which was then immersed in the water and held in place with a clamp. Upon removal from the water bath, excess water was removed with absorbent paper and the specimens were reweighed. Three specimens were measured at each immersion time, for each sample.

It had previously been found that starch-lignin foams prepared by compression molding (Stevens et al., 2010), after immersion for more than 1-2 h, were weak and no longer able to support their own weight.

Figure 11:
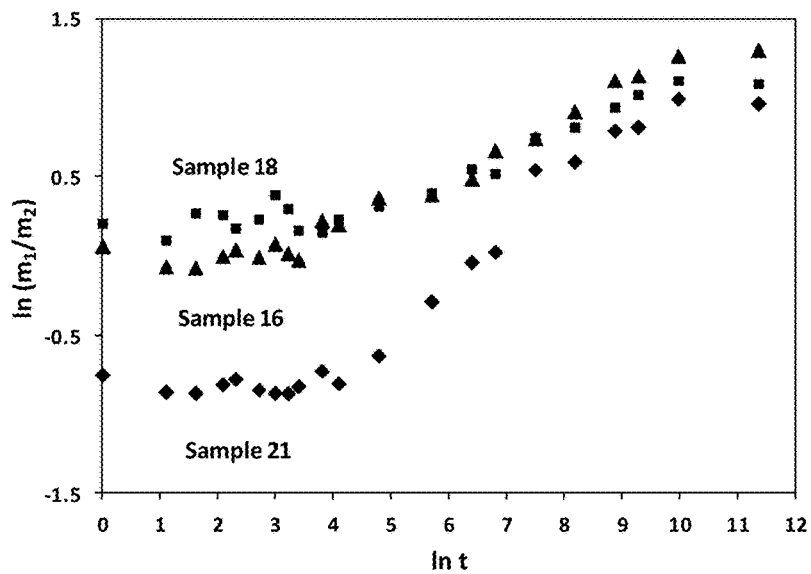
FIG. 11 shows a ln-ln plot of the weight of water absorbed (ml) relative to the dry weight (m2) versus time in seconds; sample 16 (▲), sample 18 (■), sample 21 (♦).

Water absorption was studied in further detail with samples 16, 18, and 21. FIG. 11 shows a ln-ln plot (Masaro and Zhu, 1999; Meinders and von Vliet, 2009) of the weight of water absorbed ($m_1$) in grams relative to the dry weight ($m_2$) versus time in seconds. There is an almost immediate absorption of water followed, after approximately 60 s, by the absorption of additional water. The amount of initial water absorbed is lower for sample 21 (18% lignin, 10% cellulose), but after 24 h there is no significant difference in the amount of water absorbed. After 24 h immersed in water, the samples remain intact, in contrast to compression molded starch-lignin foams (Steven et al. 2010).

SEM data (above) indicate that these extruded samples have a semi-perforated skin, and the internal structure of the foam may be a combination of interconnecting and non-connecting cells. The initial immediate water absorption may represent unhindered movement of water through a system of interconnecting cells, which is followed by diffusion through cellular walls into the non-connecting cells, eventually resulting in saturation.

Crank (1975) has solved Fick's diffusion equation for diffusion into a sphere, a model used by others (Zimmerman and Bodvarsson, 1989; Weinstein and Papatolis, 2006). Here we apply that model by adopting an equivalent-sphere approach to treat the irregularly-shaped specimens. The equivalent-sphere approach is commonly used in analyzing hydrodynamic measurements on irregularly-shaped globular proteins (Cantor and Schimmel, 1980). To express the mass of water absorbed per unit surface area, $m_1$, in g/cm², the radius of the equivalent sphere is calculated as $$r = \sqrt[3]{3V/4\pi},$$

where V is obtained from the measured specimen mass and density (FIG. 4). The surface area (cm²) is then calculated as $A=4\pi r^2$.

Figure 12:
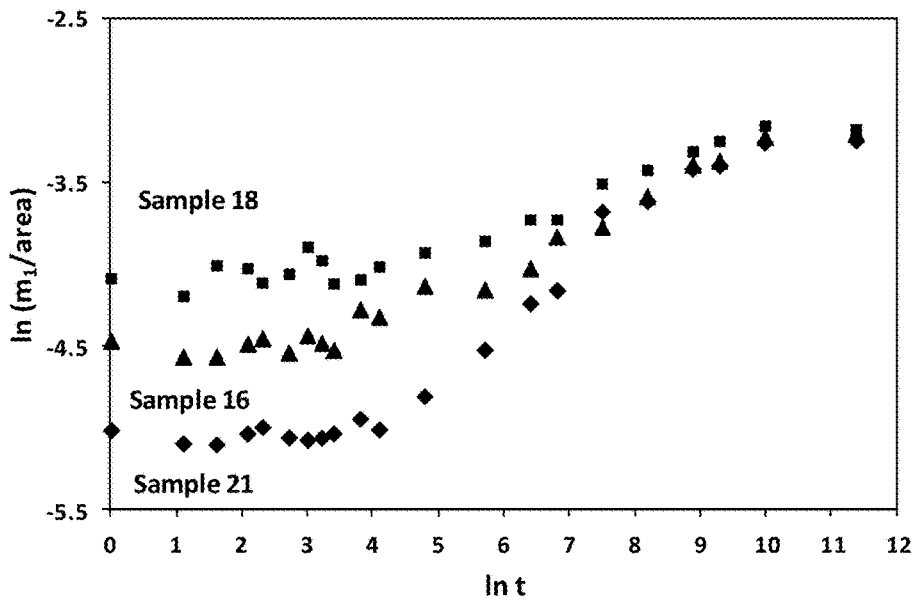
FIG. 12 shows a ln-ln plot of the weight of water absorbed (ml) per unit surface area (cm2) versus time in seconds; sample 16 (▲), sample 18 (■), sample 21 (♦).

FIG. 12 shows a ln-ln plot of the weight of water absorbed ($m_1$) in grams per unit surface area versus time in seconds. The difference between FIGS. 11 and 12 in the relative position of sample 16 at small times is the result of the lower density of that sample.

Crank (1975) provides the following expression for the amount of water (g) absorbed per unit surface area (cm²) per unit time (s))

$$m_1(t) = m_1(\infty)\{1-(6/\pi^2)\Sigma_{n=1}^{\infty}(1/n^2)\exp(-Dn^2\pi^2 t/r^2)\} \quad (1)$$

where $m_1(\infty)$ is the mass of water absorbed per unit surface area in the limit of long times and D is an effective diffusion constant, in cm²/sec.

Figure 13:
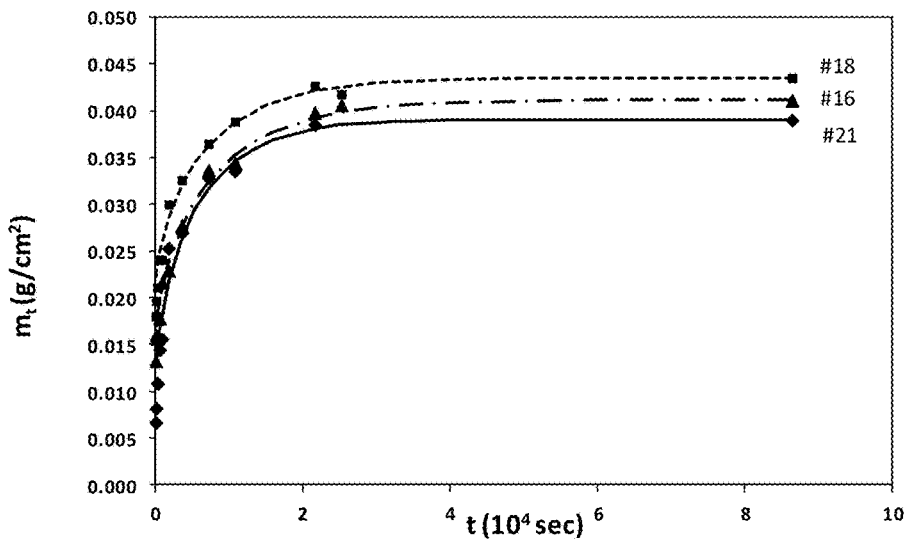
FIG. 13 shows the mass of water absorbed per unit surface area as a function of time, as expressed in Equation (1); sample 16 (▲), sample 18 (■), sample 21 (♦); lines show fitted values.

For each sample, the amount of rapidly absorbed water, measured as the average of data points taken from 1 s to 60 s, was subtracted from the later data points and the additional water absorbed, after 60 s, was fit to Equation (1). In the fitting procedure, $m_1(\infty)$ was taken as the value at 24 h. r was taken as the average equivalent-sphere radius for the measured specimens. Water absorption parameters are summarized in Table 2. Only D was varied in the fitting procedure. After the fitting, the amount of water initially absorbed was added to the fitted values of $m_r$. FIG. 13 shows the fitted results for data points taken at times of 60 s and longer.

Table 7 shows the parameters describing water absorption. The measured diffusion constant is pictured here as a measure of diffusion through the walls separating non-connecting cells. That value is not significantly different for the three samples.

TABLE 7

Parameters describing water absorption.

| Parameter | Sample 16 10% lignin No cellulose | Sample 18 9% lignin 10% cellulose | Sample 21 18% lignin 10% cellulose |
|---|---|---|---|
| r, cm | 0.85 | 0.77 | 0.73 |
| Initial water absorbed (60 s), g/g | 1.05 | 1.26 | 0.44 |
| Initial water absorbed (60 s), g/cm² | 0.0116 | 0.0174 | 0.0065 |
| Ultimate water absorbed (24 h), g/g | 3.65 | 3.13 | 2.62 |
| Ultimate water absorbed (24 h), (g/cm²) | 0.041 | 0.044 | 0.039 |
| D, $10^{-6}$ cm²/s | 7.6 | 6.7 | 7.4 |
| $\chi^2$ of fit, $10^{-5}$ | 1.6 | 3.8 | 9.7 |

The volume of water absorbed after 24 h is less than the free volume available in the foam. If the volume fraction of voids is initially taken to be 0.96 (see above), only 17% of the free volume is filled with water after 24 h. Air presumably gets trapped during absorption, preventing further absorption.

The data indicate that extruded foams prepared with unmodified high-amylose starch to which lignin has been added at a level of 9-18% have significant water resistance. After 24 h immersed in water they remain intact, in contrast to extruded unmodified starch foams and foams containing 5% lignin, which disintegrate in less than a minute (above), and in contrast to starch-lignin foams prepared by compression molding, which lose their integrity after several hours and are no longer able to support their own weight (Stevens et al., 2010).

Moreover, sample 16 (10% lignin, no cellulose) has approximately the same water resistance properties as samples 18 and 21; neither the additional lignin nor the presence of cellulose fibers in those samples significantly increases water resistance.

Baumberger et al. (1998), who studied starch-lignin films, also found that lignin improves water resistance, as long as no plasticizer is used. Stevens et al. (2007) found that if glycerol is used to plasticize cast starch-lignin films, the effect of the glycerol is to reduce or eliminate the hydrophobic effect of lignin.

Various modifications and variations of the described methods, procedures, techniques, and compositions as the concept of the invention will be apparent to those skilled in the art without departing from the scope and spirit of the invention. Although the invention has been described in connection with specific preferred embodiments, it should be understood that the invention as claimed is not intended to be limited to such specific embodiments. Various modifications of the described modes for carrying out the invention which are obvious to those skilled in the art, or related fields are intended to be within the scope of the following claims.

Each document, patent application or patent publication cited by or referred to in this disclosure is hereby expressly incorporated herein by reference in its entirety.

REFERENCES

U.S. Pat. Nos. 4,863,655; 5,043,196; 5,208,267; 5,272,181; 5,554,660; 5,756,556; 5,801,207; 5,854,345; 6,107,371; 6,184,261; and 6,365,079.

Abacha N., Kubouchi M., Sakai T.: Diffusion behavior of water in polyamide 6 organoclay nanocomposites. Express Polymer Letters, 3, 245-255 (2009). DOI: 10.3144/expresspolymlett.2009.31.

Arif, S., Burgess, G., Narayan, R., Harte, B.: Evaluation of a biodegradable foam for protective packaging applications. Packaging Technology and Science 20, 413-419 (2007). DOI: 10:1002/pts.770.

ASTM D 570: Standard test method for water absorption of plastics (2007a).

ASTM D 790: Standard test methods for flexural properties of unreinforced and reinforced plastics and electrical insulating materials (2007b).

Avérous L.: Biodegradable multiphase systems based on plasticized starch: A review. Journal of Macromolecular Science Polymer Reviews, 44, 231-274 (2004). DOI: 10.1081/mc-200029326.

Baumberger S.: Starch-lignin films. in 'Chemical modification, properties, and usage of lignin' (ed.: Hu T. Q.) Plenum Press, New York, 1-19 (2002).

Baumberger S., Lapierre C., Monties B., Della Valle G.: Use of kraft lignin as filler for starch films. Polymer Degradation and Stability, 59, 273-277 (1998).

Berketis K., Tzetzis D.: Long-term water immersion aging characteristics of GFRP composites. Journal of Material Science, 44, 3578-3588 (2009). DOI: 10.1007/s10853-009-3485-9.

Bhatnagar, S., Hanna, M. A.: Physical, mechanical, and thermal properties of starch-based plastic foams. Transactions of the American Society of Agricultural Engineers 38, 567-571 (1995).

Cantor, C. R., Schimmel, P. R.: Biophysical Chemistry Part II. Techniques for the study of biological structure and function, W.H. Freeman and Company, San Francisco (1980).

Cao X., Chen Y., Chang P. R., Muir A. D., Falk G.: Starch-based nanocomposites reinforced with flax cellulose nanocrystals. Express Polymer Letters, 2, 502-510 (2008). DOI: 10.3144/expresspolymlett.2008.60.

Carr, L. G., Parra, D. F., Ponce, P., Lugão, A. B., Buchler, P. M.: Influence of fibers on the mechanical properties of cassava starch foams. Journal of Polymers and the Environment 14, 179-183 (2006). DOI: 10.1007/s10924-006-0008-5.

Chiellini E., Solaro R.: Biodegradable polymers and plastics. Plenum Press, New York (2003).

Christensen, R. M.: Mechanics of cellular and other low-density materials. International Journal of Solids and Structures 37, 93-104 (2000). DOI: 10.1016/S0020-7683(99)00080-3.

Crank J.: The mathematics of diffusion, 2d Ed. Oxford University Press, New York (1975).

Fang, Q., Hanna, M. A.: Characteristics of biodegradable Mater-Bi®-starch based foams as affected by ingredient formulations. Industrial Crops and Products 13, 219-227 (2001). DOI: 10.1016/S0926-6690(00)00079-0.

Gibson, L. G., Ashby, M. F.: Cellular solids. Structure and Properties, 2nd ed. Cambridge University Press, Cambridge (1997).

Glasser W. G., Northey R. A., Schultz T. P.: Lignin: Historical, biological, and materials perspectives, ACS Symp. Ser., 742, American Chemical Society, Washington, D.C. (2000).

Glenn G. M., Irving D. W.: Starch-based microcellular foams. Cereal Chemistry, 72, 155-161 (1995).

Glenn G. M., Orts W. J.: Properties of starch-based foam formed by compression/explosion processing. Industrial Crops and Products, 13, 135-143 (2001). DOI: 10.1016/S0926-6690(00)00060-1.

Glenn G., Klamczynski A., Holtman K. M., Chiou B-S., Orts W. J., Wood D.: Cellulose fiber reinforced starch-based foam compositions. Journal of Biobased Materials and Bioenergy, 1, 360-366 (2007). DOI: 10.1166/jbmb.2007.010.

Glenn G. M., Orts W. J., Nobes G. A. R.: Starch, fiber and CaCO3 effects on the physical properties of foams made by a baking process. Industrial Crops and Products, 14, 201-212 (2001). DOI: 10.1016/S0926-6690(01)00085-1.

Guan, J., Hanna, M. A.: Functional properties of extruded foam composites of starch acetate and corn cob fiber. Industrial Crops and Products 19, 255-269 (2004a). DOI: 10.1016/j.indcrop.2003.10.007.

Guan, J. J., Hanna, M. A.: Extruding foams from corn starch acetate and native corn starch. Biomacromolecules 5, 2329-2339 (2004b). DOI:10.1021/bm049512m.

Guan, J., Eskridge, K. M., Hanna, M. A.: Acetylated starch-polylactic acid loose-fill packaging materials. Industrial Crops and Products 22, 109-123 (2005). DOI:10.1016/j.indcrop.2004.06.004.

Harper J. M., Tribelhorn R. E.: Expansion of native cereal starch extrudates. in 'Food extrusion science and technology' (eds.: Kokini J. L., Ho C., Karwe M. V.) Marcel Dekker, New York, 653-667 (1992).

Hwang, M. P., Hayakawa, K-I.: Bulk densities of cookies undergoing commercial baking processes. Journal of Food Science 45, 1400-1407 (1980). DOI:10.1111/j.1365-2621.1980.tb06564.x.

Hu T. Q.: Chemical modification, properties, and usage of lignin. Plenum Press, New York (2002).

Karger-Kocsis J.: Thermoset polymers containing biobased renewable resources. Express Polymer Letters, 3, 676 (2009). DOI: 10.3144/expresspolymlett.2009.84.

Krawczak P.: Plastics and composites based on renewable resources: End-of-life recycling and recovery issues. Express Polymer Letters, 2, 237 (2008). DOI: 10.3144/expresspolymlett.2008.28.

Kumar M. N. S., Mohanty A. K., Erickson L., Misra M.: Lignin and its applications with polymers. Journal of Biobased Materials and Bioenergy, 3, 1-24 (2009). DOI: 10.1166/jbmb.2009.1001.

Lawton J. W., Shogren R. L., Tiefenbacher K. F.: Effect of batter solids and starch type on the structure of baked starch foams. Cereal Chemistry, 76, 682-687 (1999).

Lawton J. W., Shogren R. L., Tiefenbacher K. F.: Aspen fiber addition improves the mechanical properties of baked cornstarch foams. Industrial Crops and Products, 19, 41-48 (2004). DOI: 10.1016/S0926-6690(03)00079-7.

Liu, Z., Chuah, C. S. L., Scanlon, M. G.: Compressive elastic modulus and its relationship to the structure of a hydrated starch foam. Acta Materiala 51, 365-371 (2003).

Liu, Z. Q., Yi, X.-S., Yi, F.: Effect of bound water on thermal behaviors of native starch, amylose and amylopectin. Starch/Stärke 51, 406-410 (1999).

Lu D. R., Xiao C. M., Xu S. J.: Starch-based completely biodegradable polymer materials. Express Polymer Letters, 3, 366-375 (2009). DOI: 10.3144/expresspolymlett.2009.46.

Maaruf A. G., Che Man Y. B., Asbi B. A., Junainah A. H., Kennedy J. F.: Effect of water content on the gelatinisation temperature of sago starch. Carbohydrate Polymers, 46, 331-337 (2001). DOI: 10.1016/S0144-8617(00)00335-0.

Masaro L., Zhu X. X.: Physical models of diffusion for polymer solutions, gels and solids. Progress in Polymer Science, 24, 731-775 (1999). DOI: 10.1016/50079-6700(99)00016-7.

McCarthy, J. L., Islam, A.: Lignin chemistry, technology, and utilization: a brief history, in 'Lignin: Historical, Biological, and Materials Perspectives' (eds. Glasser W. G., Northey R. A., and Schultz T. P.) ACS Symp. Ser., 742, American Chemical Society, Washington, D.C., 2-99 (2000).

Meinders M. B. J., von Vliet T.: Modeling water sorption dynamics of cellular solid food systems using free volume theory. Food Hydrocolloids, 23, 2234-2242 (2009). DOI: 10.1016/j.foodhyd.2009.05.007.

Müller, C. M. O., Laurindo, J. B., Yamashita, F.: Effect of cellulose fibers on the crystallinity and mechanical properties of starch-based films at different relative humidity values. Carbohydrate Polymers 77, 293-299 (2009). DOI: 10.1016/j.carbpol.2008.12.030.

Nabar, Y., Narayan, R., Schindler, M.: Twin-screw extrusion production and characterization of starch foam products for use in cushioning and insulation applications. Polymer Engineering and Science 46, 438-451 (2006a). DOI: 10.1002/pen.20292.

Nabar, Y. U., Draybuck, D., Narayan, R.: Physicomechanical and hydrophobic properties of starch foams extruded with different biodegradable polymers. Journal of Applied Polymer Science 102, 58-68 (2006b). DOI: 10:1002/app.22127.

Neumann, P. E., Seib, P. A.: Starch-based biodegradable packing filler and method of preparing same. U.S. Pat. No. 5,208,267, USA (1993).

Roberts, A. P., Garboczi, E. J.: Elastic moduli of model random three-dimensional closed-cell solids. Acta Materialia 49, 189-197 (2001).

Roberts, A. P., Garboczi, E. J.: Elastic properties of model random three-dimensional open-cell solids. Journal of the Mechanics and Physics of Solids 2002, 33-555 (2002a).

Roberts, A. P., Garboczi, E. J.: Computation of the linear elastic properties of random porous materials with a wide variety of microstructure. Proceedings of the Royal Society of London Series A—Mathematical, Physical and Engineering Sciences 458, 1033-1054 (2002b).

Roesser, D. S., Nevling, J., Rawlins, D. C., Billmers, R. L.: Biodegradable expanded starch products and the method of preparation. U.S. Pat. No. 6,107,371, USA (2000).

Rutledge, A. R., Venditti, R. A., Pawlak, J. J., Patel, S., Cibils, J. L.: Carbonized starch microcellular foam-cellulose fiber composite structures. Bioresources 3, 1063-1080 (2008).

Shogren R. L.: Effect of moisture content on the melting and subsequent physical aging of cornstarch. Carbohydrate Polymers, 19, 83-90 (1992).

Shogren, R. L.: Preparation, thermal properties, and extrusion of high-amylose starch acetates. Carbohydrate Polymers 29, 57-62 (1996).

Shogren R. L., Jasberg B. K.: Aging properties of extruded high-amylose starch. Journal of Environmental Polymer Degradation, 2, 99-109 (1994). DOI: 10.1007/BF02074778.

Shogren R. L., Lawton J. W., Teifenbacher K. F., Chen L.: Starch poly(vinyl alcohol) foamed articles prepared by a baking process. Journal of Applied Polymer Science, 68, 2129-2140 (1998). DOI: 10.1002/(SICI)1097-4628(19980627)68:13<2129::AID-APP9>3.0.CO;2-E.

Shogren R. L., Lawton J. W., Tiefenbacher K. F.: Baked starch foams: Starch modifications and additives improve process parameters, structure and properties. Industrial Crops and Products, 16, 69-79 (2002).

Shogren R. L., Lawton J. W., Doane W. M., Tiefenbacher K.: Structure and morphology of baked starch foams. Polymer, 39, 6649-6655 (1998). DOI: 10.1016/S0032-3861(97)10303-2.

Sjöqvist, M., Boldizar, A., Rigdahl, M.: Processing and properties of expanded starch materials. Journal of Cellular Plastics 45, 51-66 (2009). DOI: 10.1177/0021955X08099934.

Sjöqvist, M., Boldizar, A., Rigdahl, M.: Processing and water absorption behavior of foamed potato starch. Journal of Cellular Plastics 46, 497-517 (2010). DOI: 10.1177/0021955X10377802.

Stevens E. S., Willett J. L., Shogren R. L.: Thermoplastic starch-kraft lignin-glycerol blends. Journal of Biobased Materials and Bioenergy, 1, 351-359 (2007).

Stevens, E. S., Klamczynski, A., Glenn, G. M.: Starch-lignin foams. Express Polymer Letters 4, 311-320 (2010). DOI: 10.3144/expresspolymlett.2010.39.

Tábi T., Kovacs J. G.: Examination of injection moulded thermoplastic maize starch. Express Polymer Letters, 1, 804-809 (2007).

Tatarka, P. D., Cunningham, R. L.; Properties of protective loose-fill foams. Journal of Applied Polymer Science 67, 1157-1176 (1998).

Tiefenbacher K. F.: Starch-based foamed materials—Use and degradation properties. Journal of Macromolecular Science, Pure and Applied Chemistry A, 30, 727-731 (1993).

Tsai, J., Kulp, C. L., Maliczyszyn, W., Altieri, P. A., Rawlins, D. C.: Starch foam products with improved flexibility/compressibility and the method of preparation thereof. U.S. Pat. No. 5,756,556, USA (1998).

Weinstein, R. D., Papatolis, J.: Diffusion of liquid and supercritical carbon dioxide into a chitosan sphere. Ind. Eng. Chem. Res. 45, 8651-8655 (2006).

Willett J. L., Shogren R. L.: Processing and properties of extruded starch/polymer foams. Polymer 43, 5935-5947 (2002).

Wittek T., Tanimoto T.: Mechanical properties and fire retardancy of bidirectional reinforced composite based on biodegradable starch resin and basalt fibres. Express Polymer Letters, 2, 810-822 (2008).

Wool R. P., Sun X. S.: Bio-based polymers and composites. Elsevier, Amsterdam (2005).

Xu, Y., Hanna, M. A.: Physical, mechanical, and morphological characteristics of extruded starch acetate foams. Journal of Polymers and the Environment 13, 221-230 (2005).

Xu, Y. X., Dzenis, Y., Hanna, M. A.: Water solubility, thermal characteristics and biodegradability of extruded starch acetate foams. Industrial Crops and Products 21, 361-368 (2005).

Zhang, J.-F., Sun. X.: Biodegradable foams of poly(lactic acid)/starch. II. Cellular structure and water resistance. Journal of Applied Polymer Science 106, 3058-3062 (2007).

Zhang M. Q.: Polymeric materials from natural resources Emerging as the times require. Express Polymer Letters, 1, 406 (2007). DOI: 10.3144/expresspolymlett.2007.57.

Zimmerman, R. W., Bodvarsson, G. S.: Integral method solution for diffusion into a spherical block. Journal of Hydrology 111, 213-224 (1989).

What is claimed is:

1. An expanded cellular structure, comprising:
a mixture of:
chemically unmodified starch consisting essentially of unmodified amylose and unmodified amylopectin;
about 9-18% by weight lignin; and
about 5-10% by weight cellulose fibers,
wherein a uniform cell structure is distributed throughout the expanded cellular structure, and the expanded cellular structure has a unit density of about 36-61 kg/m$^3$, a resiliency of about 56% to 72%, a compressive strength of at least 0.16 MPa, and retains structural integrity after 1 hour of aqueous immersion.

2. The expanded cellular structure according to claim 1, wherein the chemically unmodified starch comprises approximately 70% by weight unmodified amylose.

3. The expanded cellular structure according to claim 1, produced by a process comprising extruding the mixture of chemically unmodified starch, cellulose fibers, and lignin, under heat and pressure.

4. The expanded cellular structure according to claim 1, wherein the expanded cellular structure has a density of about 36-39 kg/m$^3$.

5. The expanded cellular structure according to claim 1, wherein the expanded cellular structure has a compressive strength of 0.16 to 0.18 MPa.

6. The expanded cellular structure according to claim 1, wherein the mixture comprises 9-10% by weight lignin, wherein the expanded cellular structure has a unit density of less than about 36-39 kg/m$^3$, and a resiliency of about 63-72%.

7. The expanded cellular structure according to claim 1, wherein the lignin is chemically unmodified.

8. The expanded cellular structure according to claim 1, wherein the mixture comprises about 10-19% by weight lignin, wherein the expanded cellular structure is configured to remain intact after immersion in water for longer than 24 hours.

9. The expanded cellular structure according to claim 8, wherein the expanded cellular structure has:
   a unit density of about 39 kg/m$^3$,
   a resiliency of about 63%, and
   a compressive strength of about 0.18 MPa.

10. The expanded cellular structure according to claim 1, further comprising at least one filler which does not chemically interact with the chemically unmodified starch.

11. The expanded cellular structure according to claim 1, further comprising about 0.5% by weight of a nucleating agent to cause the mixture comprising chemically unmodified starch, lignin, and cellulose fibers to produce a uniform foam within a heated extruder.

12. The expanded cellular structure according to claim 1, wherein the expanded cellular structure remains intact after immersion in water for longer than 24 hours.

13. A method of forming the expanded cellular structure according to claim 1, comprising:
   mixing between about 9-18% by weight lignin, about 5-10% by weight cellulose fibers, and about 99-80% by weight chemically unmodified starch, of the combined weight of the lignin and the chemically unmodified starch consisting essentially of chemically unmodified amylose and chemically unmodified amylopectin, in an aqueous medium; and
   extruding the mixture under heat and pressure to form the expanded cellular structure having a uniform cell structure distributed throughout the expanded foam, having a unit density of about 36-61 kg/m$^3$, a resiliency of about 56% to 72%, a compressive strength of at least 0.16 MPa, and water resistance to retain structural integrity after 1 hour of aqueous immersion.

14. An expanded cellular structure formed by a process comprising:
   mixing chemically unmodified starch consisting essentially of chemically unmodified amylose and chemically unmodified amylopectin, about 5-10% by weight cellulose fibers, and about 9-18% by weight lignin in an aqueous medium, and
   extruding the mixture under sufficient heat and pressure to yield an expanded cellular structure,
   wherein a uniform cell structure is distributed throughout the expanded cellular structure, having a density of about 36-61 kg/m$^3$, a resiliency of about 56% to 72%, a compressive strength of at least 0.16 MPa, and sufficient water resistance to retain structural integrity after 1 hour of aqueous immersion.

15. The expanded cellular structure according to claim 14, further comprising at least one nucleating agent in an amount of about 0.5% by weight to form a uniform expanded foam.

16. The expanded cellular structure according to claim 14, wherein the lignin is chemically unmodified.

17. The expanded cellular structure according to claim 14, wherein the expanded cellular structure remains intact after immersion in water for longer than 24 hours.

\* \* \* \* \*